(12) United States Patent
Lim et al.

(10) Patent No.: US 11,994,752 B2
(45) Date of Patent: May 28, 2024

(54) SELF-CUSTOMIZED GLASSES

(71) Applicants: Seong Kyu Lim, Daegu (KR); Jong Ho Lim, Daegu (KR); Jong Yoon Lim, Daegu (KR); Myeong Hee Kim, Daegu (KR)

(72) Inventors: Seong Kyu Lim, Daegu (KR); Jong Ho Lim, Daegu (KR); Jong Yoon Lim, Daegu (KR); Myeong Hee Kim, Daegu (KR)

( * ) Notice: Subject to any disclaimer, the term of this patent is extended or adjusted under 35 U.S.C. 154(b) by 797 days.

(21) Appl. No.: 17/047,125

(22) PCT Filed: Jun. 15, 2018

(86) PCT No.: PCT/KR2018/006738
§ 371 (c)(1),
(2) Date: Oct. 13, 2020

(87) PCT Pub. No.: WO2019/198875
PCT Pub. Date: Oct. 17, 2019

(65) Prior Publication Data
US 2021/0157167 A1    May 27, 2021

(30) Foreign Application Priority Data

Apr. 13, 2018 (KR) .................. 10-2018-0043208
Apr. 24, 2018 (KR) .................. 10-2018-0047572
May 10, 2018 (KR) .................. 10-2018-0053656

(51) Int. Cl.
*G02C 5/00* (2006.01)
*G02B 27/01* (2006.01)
(Continued)

(52) U.S. Cl.
CPC ......... *G02C 5/126* (2013.01); *G02B 27/0172* (2013.01); *G02C 1/02* (2013.01);
(Continued)

(58) Field of Classification Search
None
See application file for complete search history.

(56) References Cited

U.S. PATENT DOCUMENTS 6,592,220 B1 * 7/2003 Cheong .................. G02C 1/04
351/86
7,520,605 B1 * 4/2009 Chen ...................... G02C 1/04
351/103
(Continued)

FOREIGN PATENT DOCUMENTS

JP        7-287197 A    10/1995
JP        301999 U      1/1996
(Continued)

OTHER PUBLICATIONS

International Search Report dated Dec. 19, 2018 for corresponding international application No. PCT/KR2018/006738.
(Continued)

*Primary Examiner* — Darryl J Collins
(74) *Attorney, Agent, or Firm* — Hauptman Ham, LLP

(57) ABSTRACT

The present invention relates to self-customized glasses. The self-customized glasses allow a wearer to assemble essential parts of the glasses in a self-customized type, can allow the wearer to make glasses with various forms according to the wearer's taste since allowing the wearer to select colors, patterns or designs of essential parts of the glasses by applying various custom-assembly forms or micro LED display skins to the essential parts, and provide rimless glasses with feelings of rimless glasses, half-rim glasses and full-rim glasses.

18 Claims, 40 Drawing Sheets

(51) Int. Cl.
  *G02C 1/02* (2006.01)
  *G02C 1/04* (2006.01)
  *G02C 5/12* (2006.01)
  *G02C 5/14* (2006.01)
  *G02C 11/00* (2006.01)

(52) U.S. Cl.
  CPC .............. *G02C 1/04* (2013.01); *G02C 5/008* (2013.01); *G02C 5/146* (2013.01); *G02C 11/10* (2013.01); *G02B 2027/0178* (2013.01); *G02C 2200/02* (2013.01)

(56) References Cited

U.S. PATENT DOCUMENTS

| | | | |
|---|---|---|---|
| 7,931,366 B1* | 4/2011 | Lando | G02C 5/02 351/124 |
| 8,641,188 B2* | 2/2014 | DiChiara | G02C 1/04 351/86 |
| 10,718,954 B2* | 7/2020 | Ringle | G02C 1/08 |
| 11,061,234 B1* | 7/2021 | Zhu | G01S 17/10 |
| 2005/0094090 A1* | 5/2005 | Nishioka | G02C 1/02 351/92 |
| 2006/0098157 A1* | 5/2006 | Lee | G02C 1/00 351/44 |
| 2007/0200998 A1* | 8/2007 | Schrimmer | G02C 11/04 351/158 |
| 2012/0206452 A1* | 8/2012 | Geisner | G06F 3/013 345/419 |
| 2013/0044130 A1* | 2/2013 | Geisner | G06F 3/013 345/633 |
| 2015/0378179 A1* | 12/2015 | Lim | G02C 9/04 351/57 |
| 2017/0115489 A1* | 4/2017 | Hu | G06T 19/006 |
| 2017/0131551 A1* | 5/2017 | Robbins | G02F 1/13439 |

FOREIGN PATENT DOCUMENTS

| | | |
|---|---|---|
| KR | 20-0382633 Y1 | 4/2005 |
| KR | 10-2015-0010229 A | 1/2015 |
| KR | 10-2017-0038446 A | 4/2017 |
| KR | 10-2018-0018659 A | 2/2018 |

OTHER PUBLICATIONS

Written Opinion dated Dec. 19, 2018 for corresponding international application No. PCT/KR2018/006738.

* cited by examiner (a)

(b)

(a)

(b)

(a)

(b)

(a)

(b)

SELF-CUSTOMIZED GLASSES

CROSS-REFERENCE TO RELATED APPLICATION

The present application is a national stage filing under 35 U.S.C § 371 of PCT application number PCT/KR2018/006738 filed on Jun. 15, 2018 which is based upon and claims the benefit of priorities to Korean Patent Application No. 10-2018-0043208, filed on Apr. 13, 2018; No. 10-2018-0047572, filed on Apr. 24, 2018; and No. 10-2018-0053656, filed on May 10, 2018 in the Korean Intellectual Property Office, which are incorporated herein in their entireties by reference.

BACKGROUND OF THE INVENTION

Field of the Invention

The present invention relates to glasses, and more particularly, to self-customized glasses that a wearer can freely select colors, patterns and lens sizes of essential parts of glasses according to the wearer's individuality and taste and show the wearer's creative design.

Background Art

In these days, many people wear glasses for various purposes. People mainly wear glasses for the purpose of sight correction or sight protection. Nowadays, such glasses are designed to be adapted for a time trend that people want to express their own styles and are widely utilized as items matching their fashion styles, surrounding environment or atmospheres.

Because glasses make a wearer's look and the surrounding atmosphere different according to minute differences, if the wearer can make his or her own creative design of glasses to match his or her fashion style or the surrounding atmosphere and can realize various designs for glasses, which match the trend and are ahead of the times, it is innovative in the history of glasses and may be very well received by many people.

Till now, people have selected and worn one among various glasses with hundreds to thousands of designs made by several glasses manufacturers. However, if a wearer can realize glasses with not the same design but his or her only one unique design or realize various glasses functions through glass lenses, it may be widely accepted by modern people who put emphasis on individuality and functionality. Moreover, if glasses are so innovative out of stereotypes about glasses, they may be very well received by glasses related workers as well as wearers of glasses.

Furthermore, differently from glasses which are simply painted in one color, if glasses frames, temples, or lenses of glasses are painted in one color with interruptions or painted in various colors to be changed in chroma or are changed in shape, such glasses may attract a lot of attention from consumers.

SUMMARY OF THE INVENTION

Accordingly, the present invention has been made to solve the above-mentioned problems occurring in the prior arts, and it is an object of the present invention to provide self-customized glasses, which allow a wearer to select colors or patterns of temples, a bridge, a frame, and lenses as the wearer wants and to make a creative design for the glasses according to the wearer's taste and individuality.

It is another object of the present invention to provide self-customized glasses, which are so lightweight that the wearer can wear the glasses without inconvenience and can provide designs matching the wearer's tastes and feelings of rimless glasses, half-rim glasses and full-rim glasses.

It is a further object of the present invention to provide self-customized glasses, which can allow the wearer to rapidly change or replace colors, sizes and shapes of lenses, and show the wearer's creative and unique designs for the glasses by allowing the wearer to change the glasses frame and lenses into various designs as the wearer wants while the wearer wears the glasses regardless of existence of the glasses frame.

It is a still further object of the present invention to provide self-customized glasses, which can allow the wearer to use the glasses for sight protection or sight correction according to surrounding environment, such as at days and nights, on roads, at beaches, or on snowy fields.

To accomplish the above object, according to the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, wherein magnets are respectively buried in one side portion of each lens connection head part and right and left sides of the bridge part, and magnet fixing members for the head part and for the bridge part respectively having magnets acting attraction to the magnets of the lens connection head parts and the bridge part are disposed to support and fix the lenses, and wherein transparent micro LED display skins are coated on at least one among the temples connected with the right and left lens connection head parts, the bridge part, and the lenses.

In another aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, wherein magnetically attached groove parts, in which magnets are buried, are respectively disposed in one side portion of each lens connection head part and right and left sides of the bridge part, wherein magnetic members are respectively formed at edges of the lenses so that the lenses having the magnetic members are fit and fixed to the magnetically attached groove parts by magnetism, and wherein transparent micro LED display skins are coated on at least one among the temples connected with the right and left lens connection head parts, the bridge part, and the lenses.

In further aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, wherein magnets are respectively buried in one side portion of each lens connection head part and right and left sides of the bridge part, and magnet fixing members for the head part and for the bridge part acting attraction to the magnets of the lens connection head parts and the magnets of the bridge part are disposed to support and fix the lenses. In this instance, matching uneven parts are formed flat between the inner faces of the lens connection head parts and the inner faces of the magnet fixing members and between the inner face of the bridge part and the inner faces of the magnet fixing members for the bridge part to get in surface contact with each other, or are formed between the inner faces of the right and left lens connection head parts and the inner face of the magnet fixing members for the head parts and between the inner face of the bridge part and the magnet fixing members for the bridge part to match with each other.

In a still further aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, wherein magnetically attached groove parts, in which magnets are buried, are respectively disposed in one side portion of each lens connection head part and right and left sides of the bridge part, and wherein magnetic members are respectively formed at edges of the lenses so that the lenses having the magnetic members are fit and fixed to the magnetically attached groove parts by magnetism.

In this instance, the magnetic member of each lens includes one among a transparent magnet film coated on the surface of the lens in a band shape and magnetic fragments arranged and planted at right and left end portions of the lens.

In another aspect of the present invention, there are provided self-customized glasses including: right and left half-rim frames connected with temples; a bridge part having cut surfaces; magnets buried in the cut surfaces of the bridge part in order to make the right and left half-rim frames attached to each other by magnetism; and lenses attached and fixed to fitting grooves of the right and left frames by magnetism.

In further aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, comprising: main master parts respectively mounted in the right and left lenses in order to wirelessly control transparent micro LED display skins for displaying colors and designs to the outside; and a remote slave disposed on a glasses main body to actuate the transparent micro LED display skins.

Preferably, magnets are respectively buried in one side portion of each lens connection head part and right and left sides of the bridge part, and magnet fixing members for the head part and for the bridge part acting attraction to the magnets of the lens connection head parts and the magnets of the bridge part are disposed to support and fix the lenses.

Moreover, the main master part performs wireless connection with a smart phone through short-range wireless communication, and performs wireless control to express various colors and designs of the transparent micro LED display skins of the lenses by operating a mobile application for designs and colors of the self-customized glasses downloaded to the smart phone.

In another aspect of the present invention, the self-customized glasses include a photodetector disposed at least one among the main master part and the remote slave in order to detect brightness of external light of the self-customized glasses so that the main master part and the remote slave can control brightness of the transparent micro LED display skins based on the detected quantity of external light applied to the self-customized glasses.

In further aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, comprising: right and left over lenses overlaid on the right and left lenses and coated with transparent micro LED display skins; main master parts respectively mounted in the right and left lenses in order to wirelessly control the transparent micro LED display skins; and a remote slave disposed on a glasses main body to actuate the transparent micro LED display skins.

In a still further aspect of the present invention, there are provided self-customized glasses, which includes a pair of lenses, right and left temples connected to right and left lens connection head parts, a bridge part having nose pads 8 and commonly connecting right and left lenses, and a pair of the lenses in such a way that the parts are disposed independently to be assembled to and disassembled from each other by magnetism, comprising: transparent micro LED display skins coated on the lenses combined with right and left glasses frames to display colors and designs to the outside; main master parts respectively mounted in the temples in order to wirelessly control the transparent micro LED display skins; and a remote slave disposed on a glasses frame to actuate the transparent micro LED display skins.

In this instance, the right and left glasses frames are self-customized frames capable of being assembled and disassembled by magnetism.

Furthermore, the transparent micro LED display skins are further disposed on the glasses frame to display colors and designs to the outside.

The self-customized glasses according to the present invention can allow a wearer to make glasses with various forms according to the wearer's taste since allowing the wearer to select colors, patterns or designs of essential parts of the glasses by applying various custom-assembly forms or micro LED display skins to the essential parts, and provide rimless glasses with feelings of rimless glasses, half-rim glasses and full-rim glasses. Moreover, the self-customized glasses according to the present invention can allow the wearer to express creative designs and forms to the glasses regardless of forms of the rim, for instance, half-rim glasses or full-rim glasses.

The self-customized glasses according to the present invention can allow the wearer to select and change colors or patterns of the temples, the bridge, the glasses frame, and the lenses of the glasses as the wearer wants, and to add various functions to the glass lenses. Especially, the self-customized glasses according to the present invention can change the color or the design of the glass lenses or the glasses frame in an instant by applying the micro LED display skin only to the glass lenses or to the glass lenses and the glasses frame. The self-customized glasses according to the present invention can allow the wearer to use the glasses for sight protection or sight correction according to surrounding environment, such as at days and nights, on roads, at beaches, or on snowy fields.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention allows a wearer to set glasses with his or her own creative design according to his or her fashion style or surrounding atmosphere and to apply various designs to glasses according to trends of glasses since minute differences of glasses make the wearer's feeling and look different. That is, the present invention enables the wearer to change shapes, forms or colors of glasses frames, temples and glass lenses of the glasses within a very short time regardless of place and time. Differently from glasses which are simply painted in one color, the present invention allows the wearer to change colors, patterns or chroma of the glasses frame or the temples to be changed gradually or to be changed with interruptions. Therefore, the present invention relates to glasses with a new concept which can show roles and effects suitable for the wearer's situations. Moreover, because the glasses according to the present invention are only one unique fashion glasses expressed by the wearer's creative design, the glasses according to the present invention may be widely accepted by consumers by significantly changing the concept of self-customized glasses.

Therefore, the self-customized glasses according to the present invention adopt structures that it is possible to assemble and disassemble components of the glasses and to change colors, shapes or patterns, and that it is possible to coat essential components of the glasses exposed to the outside with transparent micro LED display skins.

Figure 1:
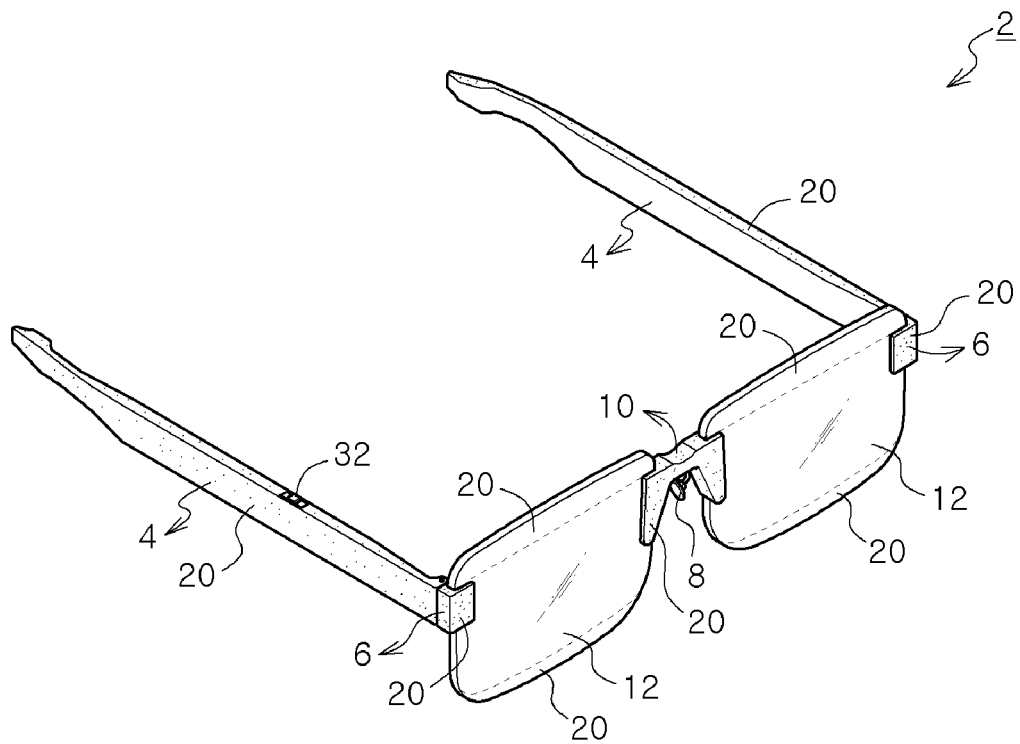
FIG. 1 is an exploded plan sectional view of a lens connection head part and a bridge part for fixing custom glass lenses by magnetism according to a first preferred embodiment of the present invention.
Figure 2:
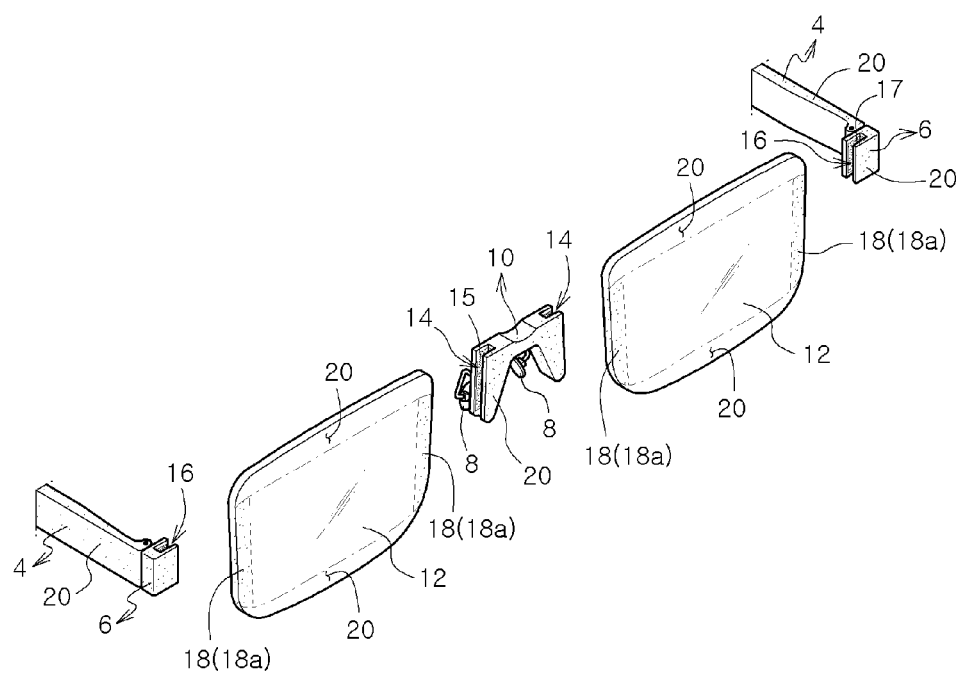
FIG. 2 is an exploded perspective view of FIG. 1.
Figure 6:
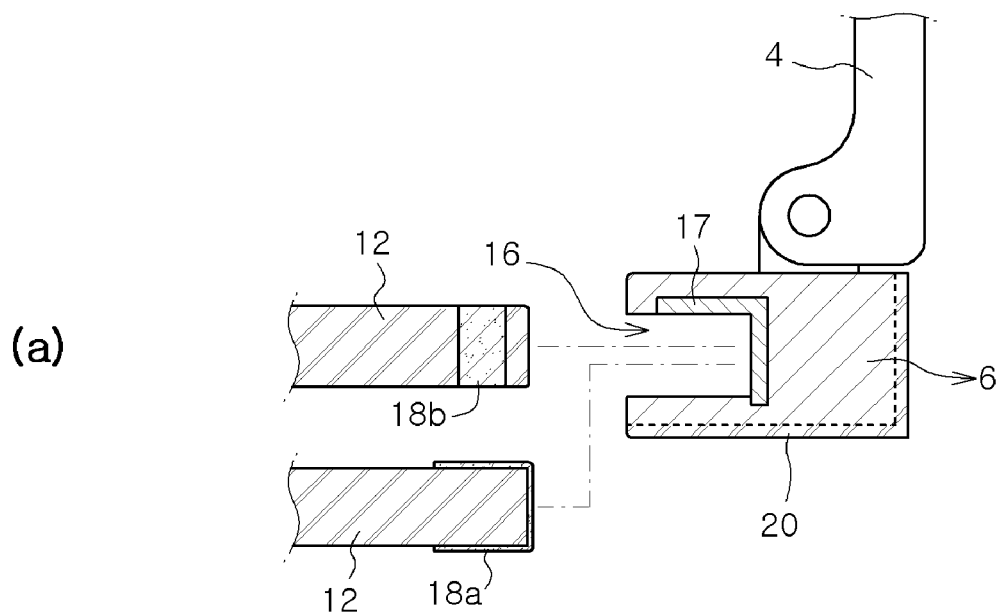
FIG. 6 is a separate plan sectional view of a lens connection head and a bridge portion for magnetically fixing a spectacle lens according to an embodiment of the present invention
Figure 6:
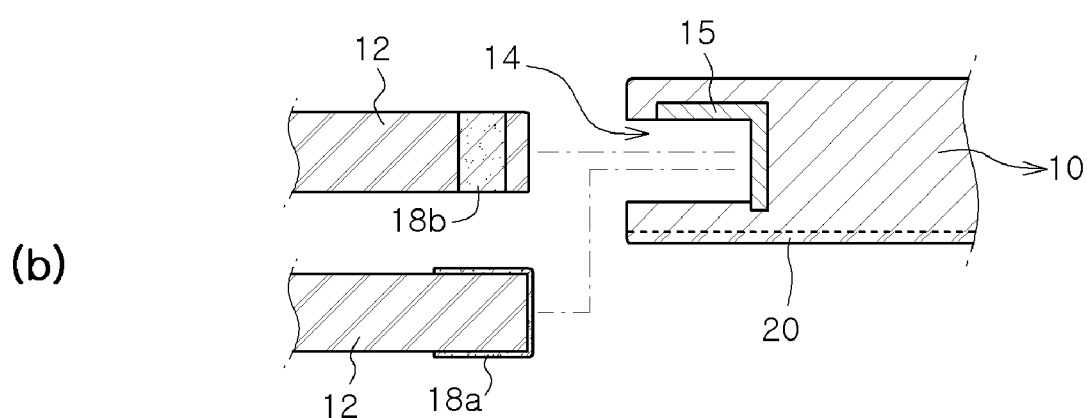

FIG. 1 is a perspective view of self-customized glasses 2 according to a first preferred embodiment of the present invention, FIG. 2 is an exploded perspective view of FIG. 1, and FIG. 6 is an exploded plan sectional view of a lens connection head part 6 and a bridge part 10 which fix glass lenses 12 of the first preferred embodiment by magnetism.

The self-customized glasses 2 according to the first preferred embodiment of the present invention illustrated in FIGS. 1 and 2 are separable self-customized rimless glasses. That is, the self-customized glasses 2 according to the first preferred embodiment illustrated in FIGS. 1 and 2 are rimless glasses connected by magnetism without any glasses frame, and include right and left temples 4, right and left lens connection head parts 6 hinge-connected to the right and left temples 4, a bridge part 10 having nose pads 8 and connecting right and left lenses 12 with each other, and a pair of lenses 12. The components of the glasses can be assembled, disassembled, and fixed by magnetism.

The bridge part 10 includes magnetically attached groove parts 14 formed at right and left side walls thereof so that lenses 12 are inserted into the magnetically attached groove parts 14 to be fixed by magnetism, and magnets 15 buried in inner walls of the magnetically attached groove parts 14. Moreover, the right and left lens connection head parts 6 hinge-connected with the temples 4 include magnetically attached groove parts 16 formed at inner walls thereof so that outer portions of the right and left lenses 12 are inserted into the magnetically attached groove parts 16 to be fixed by electric power, and magnets 17 buried in inner walls of the magnetically attached groove parts 16.

FIG. 2 illustrates that the magnets 15 and 17 are buried in the inner walls of the magnetically attached groove parts 14 and 16, but they may be buried in the inner walls of front and rear opposite sides of the magnetically attached groove parts 14 and 16 or may be buried to the inner walls of the core parts of the magnetically attached groove parts 14 and 16. Furthermore, the magnets 15 and 17 may adopt a magnet fragment form or may adopt a form that magnet powder is mixed with resin if the bridge part 10 or the lens connection head parts 6 are made of a resin material.

FIG. 2 illustrates that each of the magnets 17 buried in the inner wall of the magnetically attached groove part 17 of the lens connection head part 6 is buried in the inner wall part of one side of the magnetically attached groove part 17 and the inner wall part of the core part (See FIG. 6), but if necessary, the magnet 17 may be buried in the front inner wall part of the magnetically attached groove part 17.

Right and left end portions of the lenses 12 are attached to the magnetically attached groove part 17 of the lens connection head part 6 and the magnetically attached groove part 14 of the bridge part 10 without support of the glasses frame. In order to achieve the above, magnetic members 18 for magnetic attachment are disposed at right and left end portions of the lens 12.

FIG. 2 illustrates transparent magnet films 18a as the magnetic members 18 disposed at the right and left end portions of the lens 12, and the transparent magnet films 18a extend vertically in a band shape.

The transparent magnet films 18a extended and coated vertically in the band shape may be cobalt-added titanium dioxide ($Co:TiO_2$) that cobalt atoms of several percent (%)

having the magnetic property are added to titanium dioxide (TiO$_2$), and the cobalt-added titanium dioxide (Co:TiO$_2$) film does not lose magnetism not only at room temperature but also at high temperature and is almost transparent with respect to visible light. The transparent magnet films 18*a* made of (Co:TiO$_2$) is a ferromagnetic body at room temperature.

Figure 3:
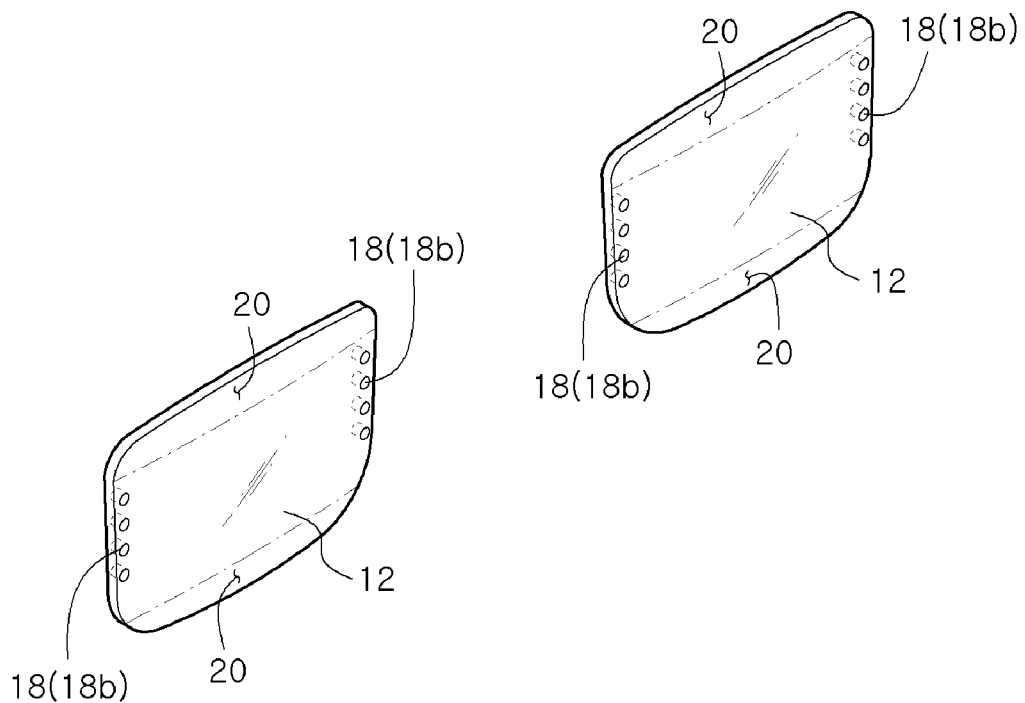
FIG. 3 is an exemplary view of a modification of the spectacle lens in an embodiment of the present invention, 4 is a side cross-sectional view of fashion

FIG. 3 illustrates magnetic members 18 disposed at right and left end portions of the lens 12. In FIG. 3, a plurality of magnets or a plurality of magnetic fragments 18*b* like metal cores are planted and arranged vertically.

Therefore, the lenses 12 are inserted and fixed between the lens connection head parts 6 of the temples 4 and the bridge part 10 by magnetism force so that the self-customized glasses 2 according to the present invention can be assembled without any glasses frame by magnetism.

FIG. 6(A) is a plan sectional view showing that the lenses 12 are inserted into the magnetically attached groove parts 16 of the lens connection head parts 6 of the temples 4 and are fixed by magnetism, and FIG. 6(B) is a plan sectional view showing that the lenses 12 are inserted into the magnetically attached groove parts 16 of the bridge part 10 and are fixed by magnetism.

Figure 4:
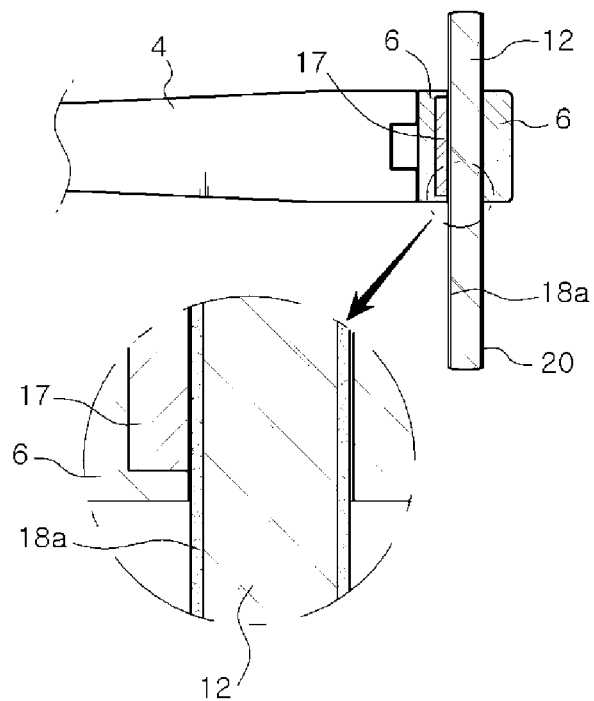
FIG. 4 is a side cross-sectional view of fashion glasses to which the spectacle lenses shown in FIG. 2 are magnetically fixed.
Figure 5:
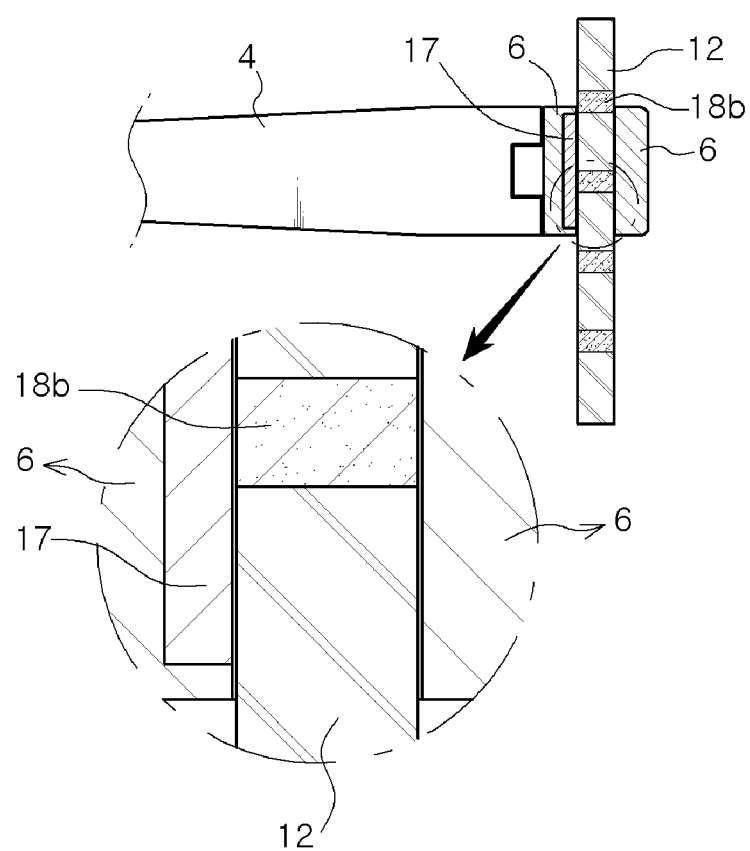
FIG. 5 is a side cross-sectional view of fashion glasses in which the spectacle lenses shown in FIG. 3 are magnetically fixed.

FIG. 4 is a side sectional view of the self-customized glasses 2 that the transparent magnetic films 18*a* of the lenses 12 illustrated in FIG. 2 are fixed to the magnets 17 buried in the inner walls of the magnetically attached groove parts 16 of the lens connection head parts 6. FIG. 5 is a side sectional view of the self-customized glasses 2 that the magnetic fragments 18*b* of the lenses 12 illustrated in FIG. 2 are fixed to the magnets 17 buried in the inner walls of the magnetically attached groove parts 16 of the lens connection head parts 6.

In the first preferred embodiment described referring to FIGS. 1 to 6, magnetic attachment using the magnetic members 18 formed in the magnetically attached groove parts 16 and the lenses 12 is described. In a third preferred embodiment of the present invention illustrated in FIGS. 14 to 17 as a modification, magnetic attachment using two magnets without the magnetic members 18 of the lenses 12 is described.

Figure 14:
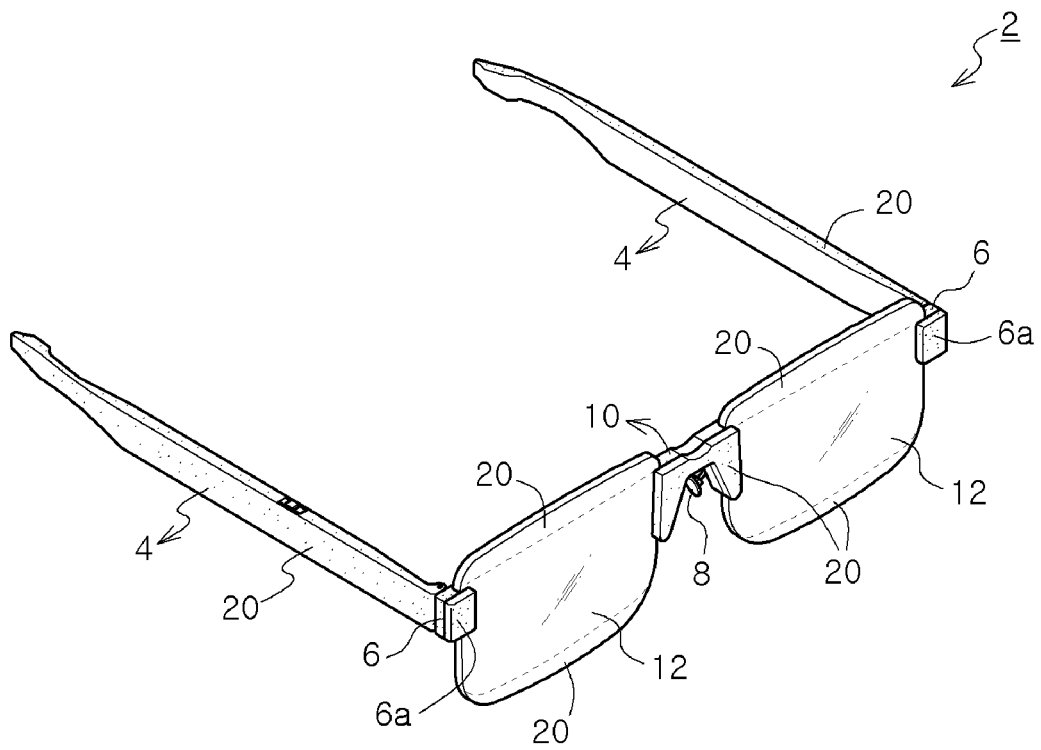
FIG. 14 is a perspective view of self-customized glasses according to a third preferred embodiment of the present invention.
Figure 15:
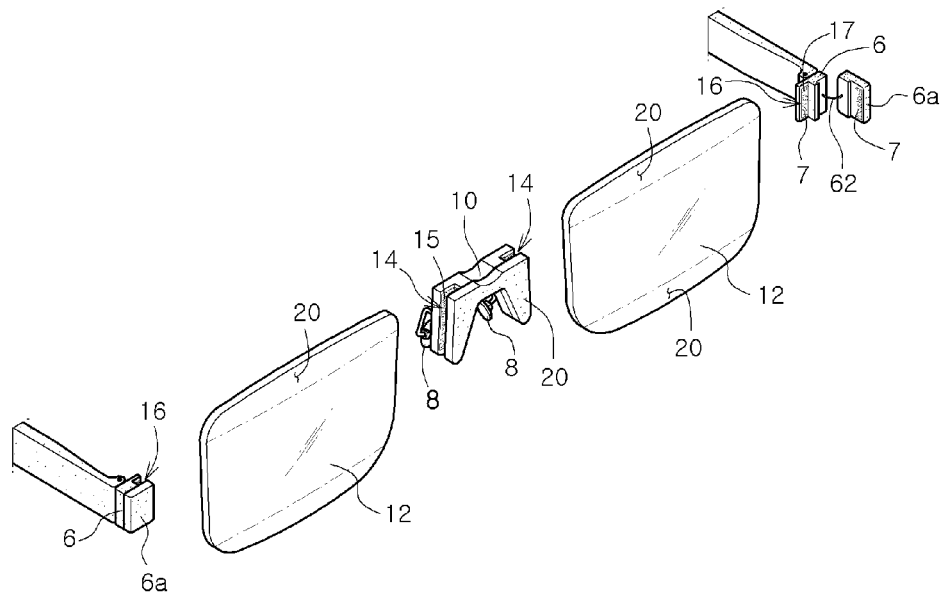
FIG. 15 is an exploded perspective view of essential parts of FIG. 14.
Figure 16:
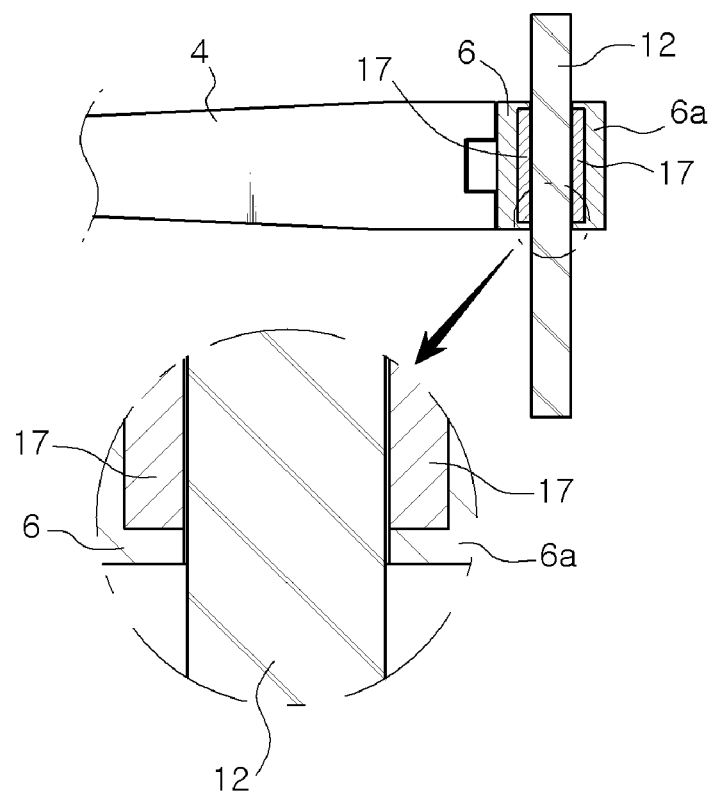
FIG. 16 is a vertically sectional view of a lens connection head part of FIG. 14.
Figure 17:
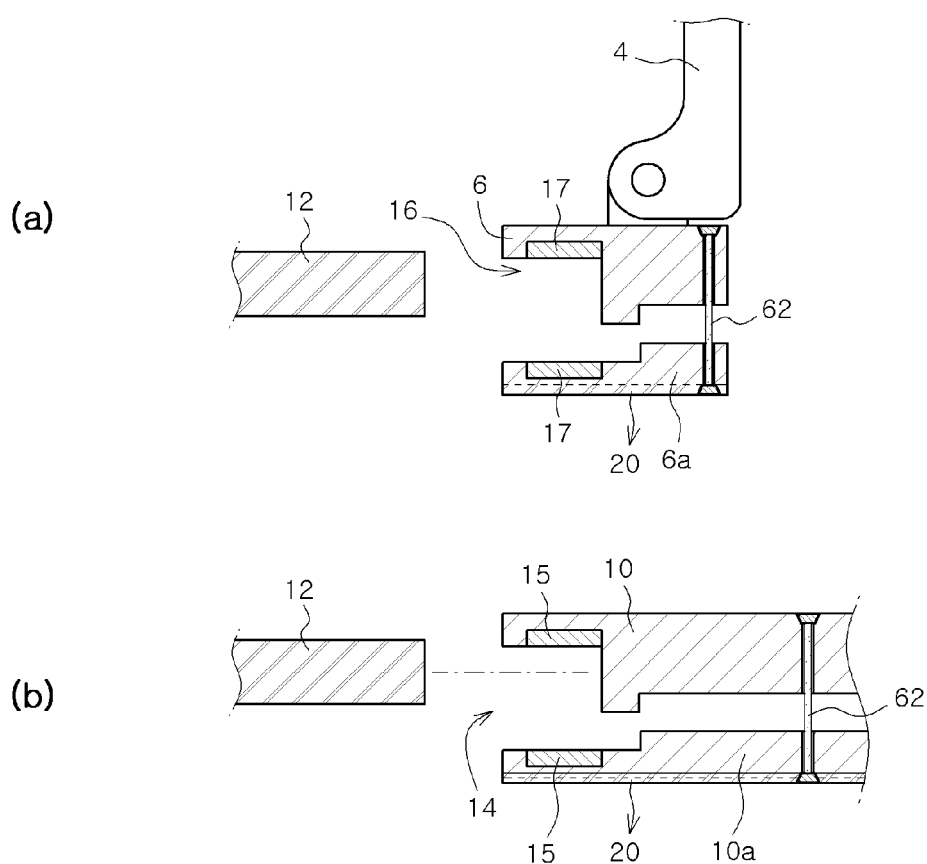
FIG. 17 is a plan sectional view of the lens connection head part and a bridge part of the self-customized glasses according to the third preferred embodiment of the present invention.

FIGS. 14 to 17 illustrate self-customized glasses 2 according to third and fourth preferred embodiments of the present invention. FIG. 14 is a perspective view of self-customized glasses according to a third preferred embodiment of the present invention, FIG. 15 is an exploded perspective view of essential parts of FIG. 14, FIG. 16 is a vertically sectional view of lens connection head parts 6 of FIG. 14, and FIG. 17 is a plan sectional view of the lens connection head parts 6 and a bridge part 10 of the self-customized glasses 2 according to the third preferred embodiment of the present invention.

Differently from the first preferred embodiment illustrated in FIGS. 1 to 6, the lenses 12 of the self-customized glasses 2 according to the third preferred embodiment do not have the magnetic members 18. Instead of the magnetic members 18, each of the lens connection head parts 6 includes a magnet fixing member 16*a* having a magnet 17 without the magnetically attached groove part 16, and the bridge part 10 includes a magnet fixing member 10*a* having a magnet 15 without the magnetically attached groove part 14.

Because the magnet fixing member 6*a* for the head part and the magnet fixing member 10*a* for the bridge part are made in an independent form, it is feared that they are lost. Therefore, if necessary, the magnet fixing member 6*a* for the head part and the magnet fixing member 10*a* for the bridge part may be suspended on the corresponding lens connection head part 6 and the corresponding bridge part 10 by elastic or nonelastic connection cords 62.

Therefore, in the self-customized glasses 2 according to the third preferred embodiment of the present invention, an edge of one side of the lens 12 is supported and fixed by magnetism of the magnet 17 buried in the lens connection head part 6 and the magnet 17 of the magnet fixing member 6*a* for the head part, and an edge of the other side of the lens 12 is supported and fixed by magnetism of the magnet 15 buried in the bridge part 10 and the magnet 15 of the magnet fixing member 10*a* for the bridge part.

As described above referring to FIGS. 1 to 6, if the lenses 12 are inserted between the lens connection head parts 6 of the temples 4 and the bridge part 10 and are attached and fixed by magnetism, the wearer can adjust height of the lenses 12 according to the wearer's taste.

Because the lenses 12 are free from the glasses frame, the shape and form of the lenses may be varied, the wearer can freely select lenses 12 according to his or her individuality or surrounding environment or situations. That is, the wearer may select lenses in the same shape, size and color, but may select lenses in different shapes, sizes and colors, and freely assemble and disassemble the glasses components.

Figure 7:
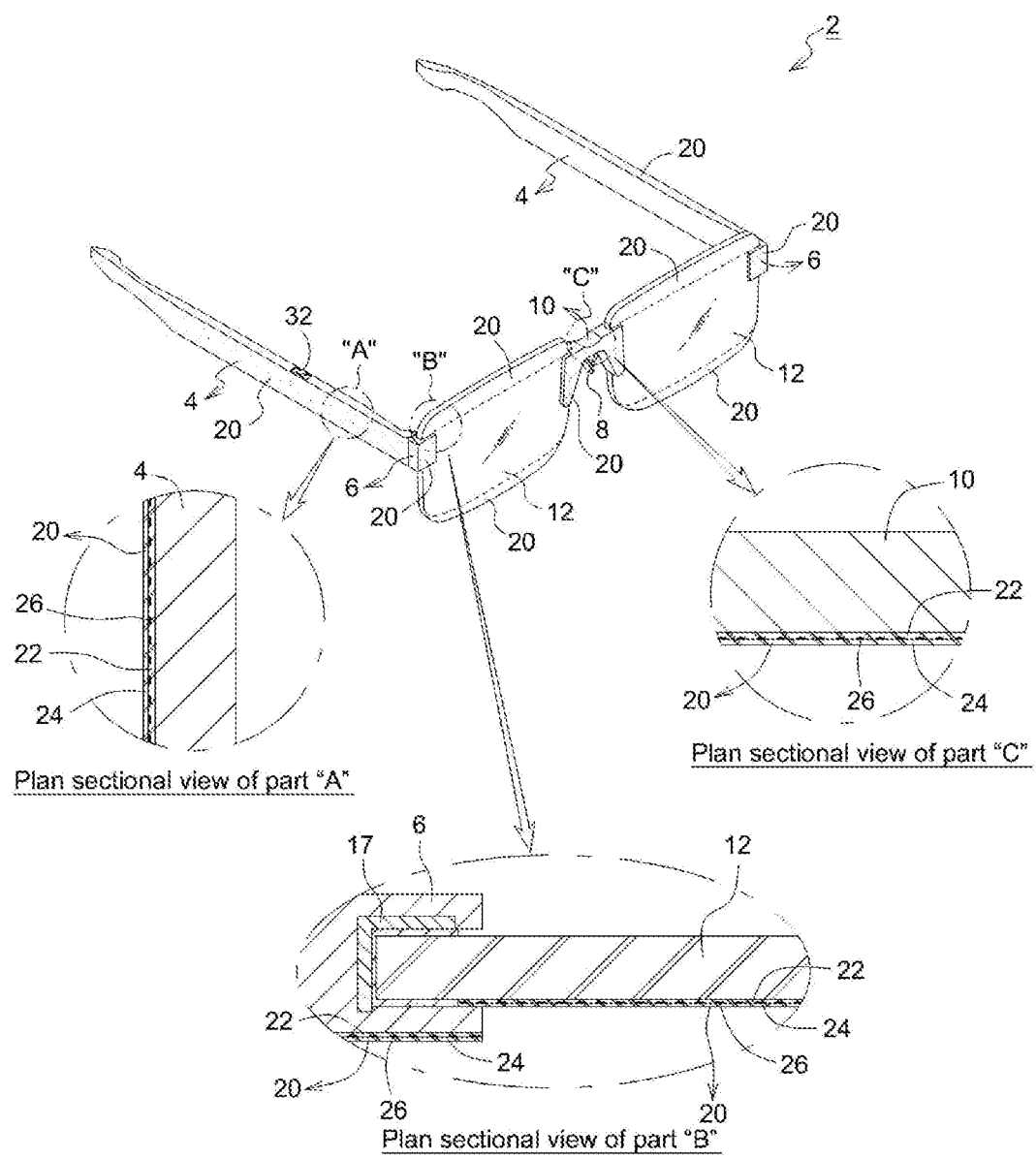
FIG. 7 is a view showing a state where a transparent micro LED display skin is coated on the outer surface of the glasses according to the present invention.

In the meantime, as shown in FIG. 7, transparent micro LED display skins 20 are coated on a surface portion exposed to the outside so that the wearer can freely express colors, patterns or designs on the temples 4, the lens connection head parts 6, the bridge part 10, and the outer circumferential portions, especially, upper and lower outer circumferences, of the lenses 12, which are essential parts of the self-customized glasses 2 according to the present invention.

FIG. 7 is a view showing a state where the transparent micro LED display skins 20 are coated on the outer surfaces of the glasses according to the present invention. For instance, the transparent micro LED display skins 20 are coated on the outer surfaces (side and upper portion) of the right and left temples 4, the outer surfaces (front and upper portions) of the right and left lens connection head parts 6, the outer surface (front and upper portions) of the bridge part 10, and outer circumferential surfaces (especially, upper and lower outer circumferential portions) of the right and left lenses 12.

Because the lenses 12 are independently and easily separable, the wearer can freely select sizes of the lenses and can apply different designs, colors or patterns to the right and left temples 4 having the right and left lens connection head parts 6 and the bridge part 10 to which the transparent micro LED display skins 20 are applied.

The micro LED display is a display that micro LED particles of 5 μm to 100 μm (1/100,000 cm) are stuck on a substrate, is suitable to implement a flexible screen or a rollable screen utilizing LED chips as pixels, is available for a long period of time since being less in power consumption than OLEDs, and is more excellent in intensity of illumination, chroma and power efficiency than the existing OLEDs.

Such a micro LED display is coated and attached to the surface part of the self-customized glasses 2, and includes a transparent substrate 22 having transparency and flexibility in order to show the intrinsic color of the self-customized glasses 2 as it is even though the micro LED display does not work, and micro LED pixels 26 of the micro LED chips having maximized transparency.

The micro LED display is formed in such a way that a semiconductor device layer 24 having the micro LED pixels 26 is planted in the transparent substrate 22 using micro transfer printing technique. In this instance, it is preferable to transfer and adhere more than 10,000 micro LED pixels 26 per second to the transparent substrate 22 using roll transfer technique of the transfer printing technique.

The micro LED pixels 26 are prepared on a native substrate and is transferred and printed on the transparent substrate 22, and then, the native substrate and unnecessary parts are removed.

In this embodiment, the transparent substrate 22 is transparent and/or soft. The transparent substrate 22 has one among thickness ranges of 5 to 10 μm, 5 to 50 μm, 50 to 100 μm, 100 to 200 μm, 200 to 500 μm, 0.5 to 1 mm, 1 to 5 mm, and 5 to 10 mm.

Figure 8:
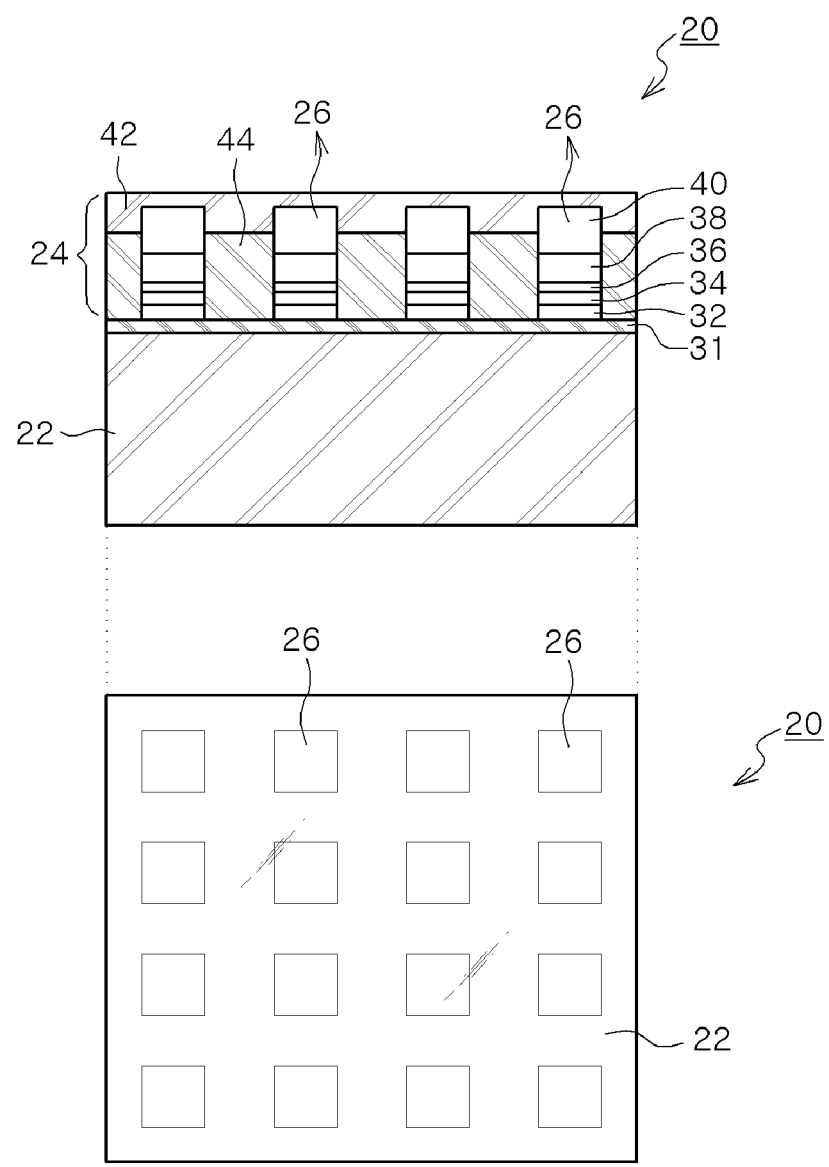
FIG. 8 is a view showing an example of the transparent micro LED display skin applied to embodiments of the present invention.

FIG. 8 is a view showing an example of the transparent micro LED display skin 20 applied to embodiments of the present invention. The semiconductor device layer 24 having the micro LED pixels 26 is adhered on the transparent substrate 22 having transparency and flexibility.

In FIG. 8, each of the micro LED pixels 26 of the semiconductor device layer 24 includes a biterminal layer 31, a transparent conductive layer 32, a transparent p-electrode layer 34, a p-GaN layer 36, an active layer 38, an n-GaN layer 40, and an upper transparent n-electrode layer 42. A transparent insulation layer 44 is formed between the micro LED pixels 26. The micro LED pixels 26 formed on the semiconductor layer 24 are p-n diode layers and compound semiconductors having band gaps corresponding to specific areas in a spectrum. In the example of the self-customized glasses according to the present invention, the micro LED pixels 26 are made of gallium nitride (GaN), which is a representative example of groups III to V nitride materials.

The transparent p-electrode layer 34 is to supply electric power and forms electrodes with oxide, such as Al, Ga, Ag, Sn, In, Zn, Co, Ni, and Au having more than 70% penetration ratio. The biterminal layer 90 becomes a circuit pattern, a bump, or a conductive adhesive layer, and the transparent n-electrode layer 42 has electrical conductivity. The biterminal layer 31 may be selected from silver and nickel groups reflexibility to visible spectrum and forms a latent reflective mirror layer.

Additionally, the present invention can form full-color transparent micro LED display skins 20 by arranging three red, green and blue elements, namely, micro LED panels.

Figure 9:
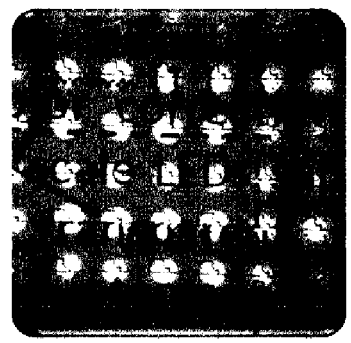
FIG. 9 is a photograph showing an operational example of the transparent micro LED display skin applied to the present invention.

FIG. 9 is a photograph showing an operational example of the transparent micro LED display skin 20 applied to the present invention. Since the transparent micro LED display skin 20 is transparent, patterns having colors or characters existing on or projected onto a main body background of the parts, namely, the temples 14, the lenses 12, the bridge part 10, the lens connection head parts 6, and so on, of the self-customized glasses 2 can be revealed as they are.

Moreover, the transparent micro LED display skin 20 may be adhered onto the entire surface of the lens 12 as shown in FIGS. 35 to 53, or may be adhered just to the outer circumferential portion of the lens 12 as shown in FIGS. 2 and 3.

As shown in FIGS. 2 and 3, in the case that the transparent micro LED display skin 20 is adhered just to the outer circumferential portion of the lens 12, if the transparent micro LED display skin 20 of the lens 12 does not work, since only the lens 12 is shown, the self-customized glasses 2 are shown as rimless glasses, if the transparent micro LED display skin 20 of an upper portion of the outer circumferential portion of the lens 12 works, the self-customized glasses are shown as half-rim glasses, and if all of the transparent micro LED display skins 20 of upper and lower portions of the outer circumferential portion of the lens 12 work, the self-customized glasses 2 are shown as full-rim glasses.

Furthermore, in the present invention, because the lenses 12 are rimless glasses, self-assembly glasses frame may be attached thereto.

The self-customized glasses 2 according to the present invention include circuits embedded in the parts of the glasses in order to activate the transparent micro LED display skins 20 mounted on the parts.

Figure 10:
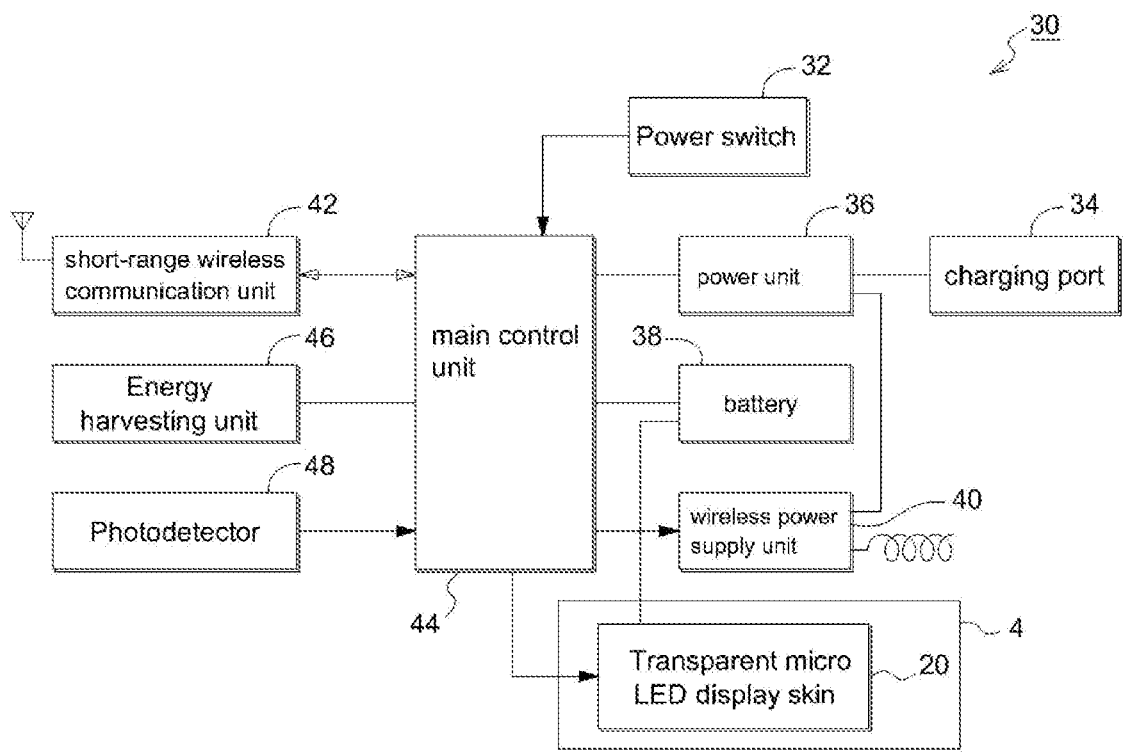
FIG. 10 is a circuit block diagram of a main master part embedded in temples of the self-customized glasses according to the present invention.
Figure 11:
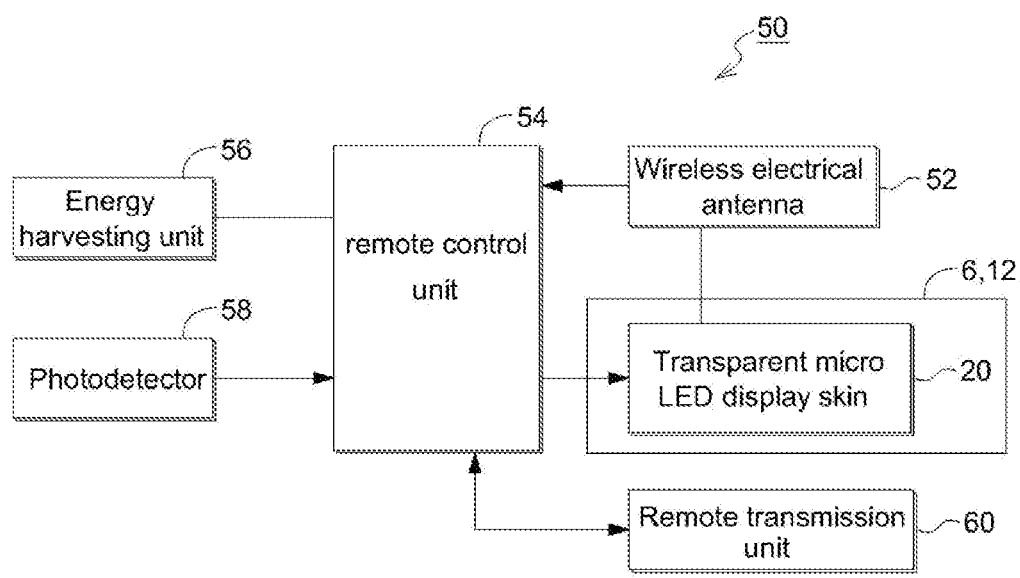
FIG. 11 is a circuit block diagram of remote slaves formed at lenses and lens connection head parts of the self-customized glasses according to the first preferred embodiment of the present invention.

FIG. 10 is a circuit block diagram of a main master part 30 embedded in temples 4 of the self-customized glasses 2 according to the present invention, and FIG. 11 is a circuit block diagram of remote slaves 50 formed at lenses 12 and lens connection head parts 6 of the self-customized glasses 2 according to the first preferred embodiment of the present invention.

Referring to FIG. 10, the main master part 30 mounted on the temple 4 of the self-customized glasses 2 includes: a power switch 32; a charging port 34 for charging an internal battery through an USB cable; a power unit 36; a battery 38; a wireless power supply unit 40 having a wireless electric coil for wirelessly supplying electric power to the lens connection head parts 6 and the lenses 12; a short-range wireless communication unit 42 for short-range wireless communication with an external device, such as a smart phone 60 (FIG. 12), or a remote control unit 54 of FIG. 11; a main control unit 44 for performing control to express colors and designs of the glasses; an energy harvesting unit 46 for self-generation of energy; and a photodetector 48 for detecting brightness of external light of the self-customized glasses 2.

In the present invention, an IC chip of the main control unit 44 embedded in the temple 4 is preferably an application specific integrated circuit (ASIC), and controls to supply energy using wireless electricity and a solar cell, which is an example of the energy harvesting unit 46.

Referring to FIG. 11, the remote slave 50 of the lens connection head part 6 or the lens 12 for wirelessly receive electric power supplied from the temple 4 includes: a wireless electrical antenna 52; an IC chip type remote control unit 54 for operating and controlling the corresponding transparent micro LED display skin 20; and a remote transmission unit 60 for very close remote transmission with the main master part 30.

Moreover, the remote slave 50 further includes: an energy harvesting unit 56 for self-generation of energy; and a photodetector 58 for detecting brightness of external light of the self-customized glasses 2.

An integrated circuit (IC) of the remote control unit can organize a direct circuit in microns using a complementary-metal-oxide semiconductor (CMOS). An area of the IC chip is up to 1 mm×1 mm, and thickness is up to 0.5 mm.

Power generated through resonance phenomenon from the wireless electric coil of the wireless power supply unit 40 disposed in the temple 4 of the self-customized glasses 2 is received from the wireless electric antenna 52 of the lens 12 or the lens connection head part 6, and the power received through control of the remote control unit 54 is used to operate the transparent micro LED display skins 20 of the lens 12 and the lens connection head part 6.

The photodetectors 48 disposed in the lens connection head parts 6, the lenses 12, and the temples 4 sense the quantity of external light applied to the self-customized glasses 2 and applies to the corresponding main control unit 44 or the remote control unit 54. The corresponding main control unit 44 or the remote control unit 54 controls display brightness of the transparent micro LED display skin 20 based on the quantity of light. Brightness of the transparent micro LED display skin 20 around the self-customized glasses 2 may be automatically controlled according to day and night.

The lenses 12 according to the present invention can wirelessly receive electric power by transferring resonant energy based on oscillatory magnetic field, and information of the parts, such as the lens 12, can be transferred to the main master part 30 or the smart phone 60 through the wireless transmission method.

The energy harvesting units 46 and 56 illustrated in FIG. 10 or 11 are means for harvesting ambient energy, and generates electric power without supply of power source of a battery and supply the generated energy to parts embedded in the self-customized glasses. The energy harvesting units 46 and 56 are organized by any one or combination of a photoelectric device, a thermoelement, a piezoelectric element, and a wireless electric conversion device.

Therefore, the self-customized glasses 2 according to the present invention enables wearers to create various designs of glasses suitable for trends these days, and can express colors and designs of the glasses using the transparent micro LED display skins 20. Differently from the glasses which are simply painted in one color, the self-customized glasses according to the present invention are fashion glasses with a creative design that color is coated with interruptions or chroma is varied to change a pattern.

Figure 12:
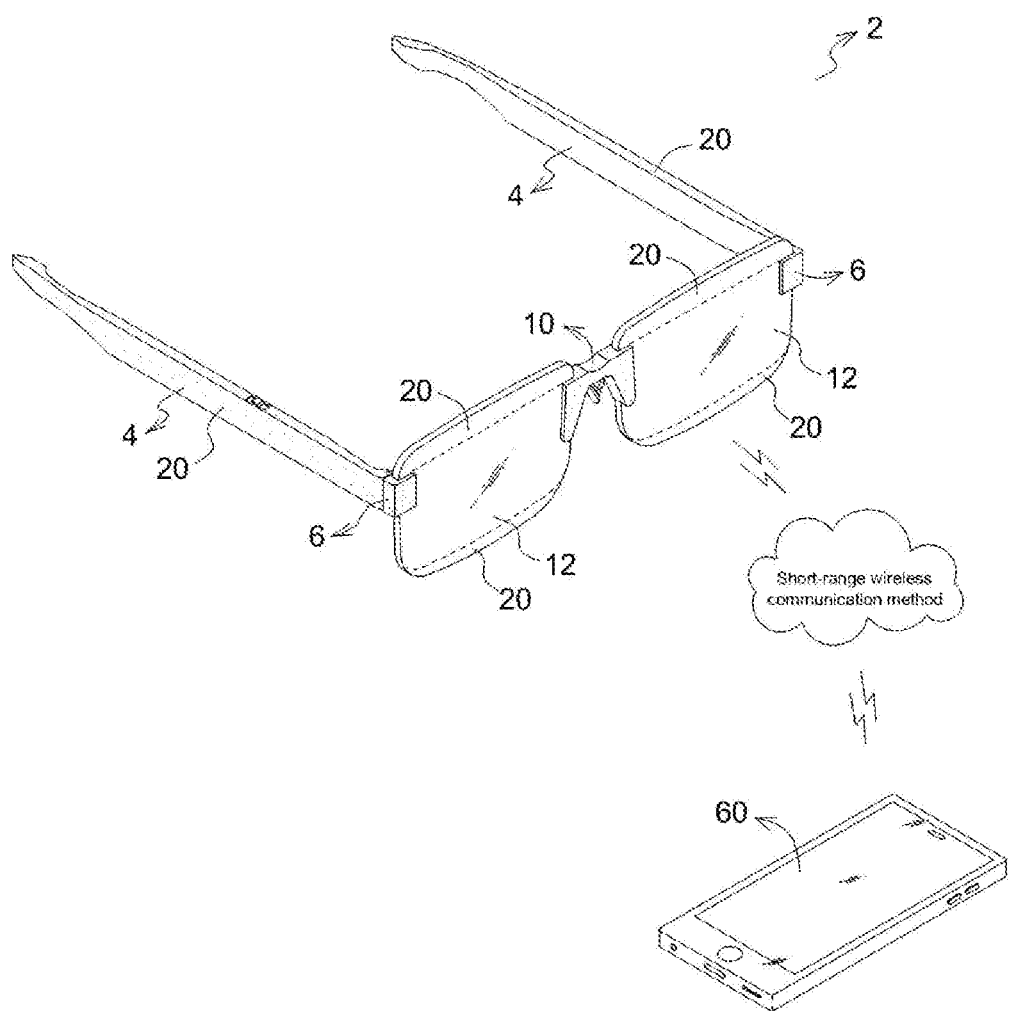
FIG. 12 is a view showing control for changing designs and colors of the glasses between the self-customized glasses and a smart phone according to the present invention.

FIG. 12 is a view showing control for changing designs and colors of the glasses between the self-customized glasses 2 and the smart phone 60 according to the present invention.

In the present invention, the main master part 30 of the self-customized glasses 2 can be connected with the smart phone 60 wirelessly using the short-range wireless communication method, such as Bluetooth communication, Wi-Fi communication, NFC communication, and IR communication. The self-customized glasses according to the eighth preferred embodiment of the present invention can control and express various colors and designs by operating a mobile application for designs and colors of the self-customized glasses 2 downloaded to the smart phone 60.

Figure 13:
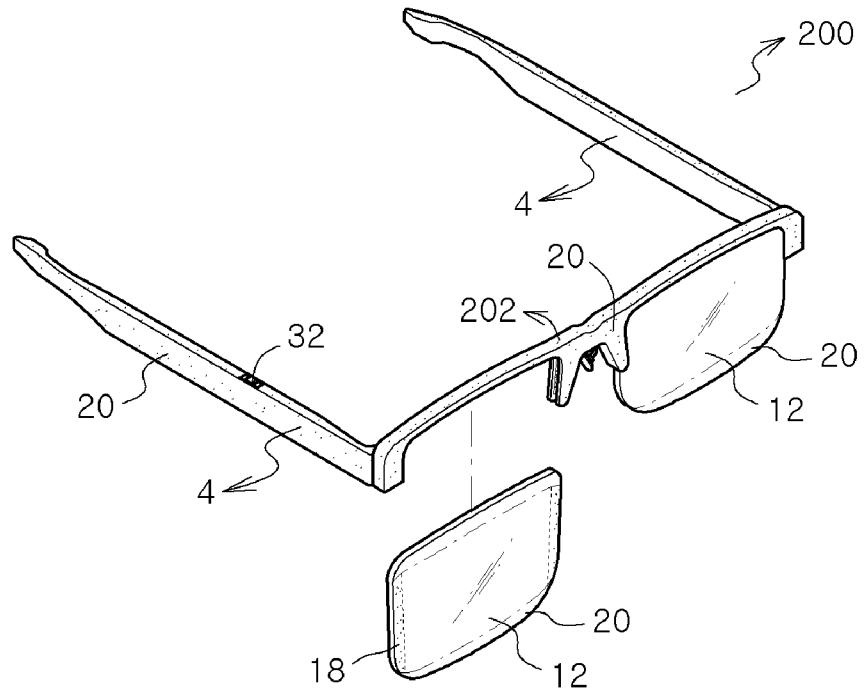
FIG. 13 is a perspective view of half-rim glasses according to a second preferred embodiment of the present invention.

In the first preferred embodiment of the present invention, the present invention is applied to self-assembly glasses, but may be also applied to half-rim glasses 200 as shown in FIG. 13.

FIG. 13 is a perspective view of half-rim glasses 200 according to a second preferred embodiment of the present invention. The lenses 12 are detachably attached to a glasses frame 202 of the half-rim glasses 200 by magnetism, and transparent micro LED display skins 20 are formed on the temples 4, the glasses frame 202, and the lenses 12. The half-rim glasses 200 according to the second preferred embodiment of the present invention are operated as described above.

FIGS. 18 to 24 illustrate self-customized glasses 2 formed without the transparent micro LED display skins 20 according to fourth to seventh preferred embodiments of the present invention.

The self-customized glasses 2 according to the fourth to seventh preferred embodiments of the present invention illustrated in FIGS. 18 to 24 are implemented to be variable in colors or patterns through assembly and disassembly of parts of the glasses, and if necessary, an outer rim portion of the lens may be added in an assembly manner.

Figure 18:
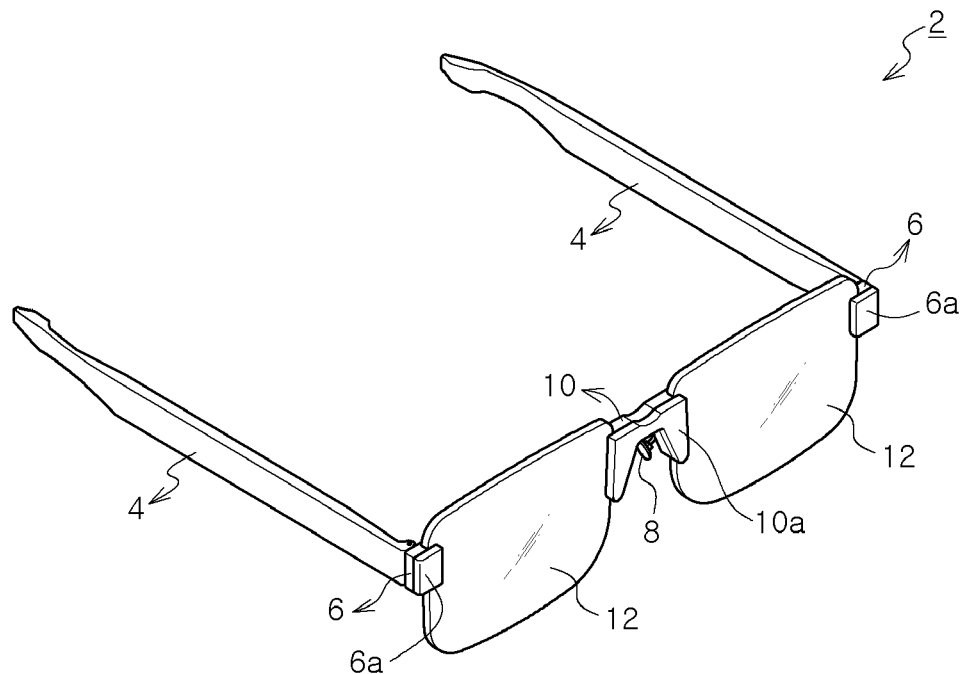
FIG. 18 is a perspective view of self-customized glasses according to a fourth preferred embodiment of the present invention.
Figure 19:
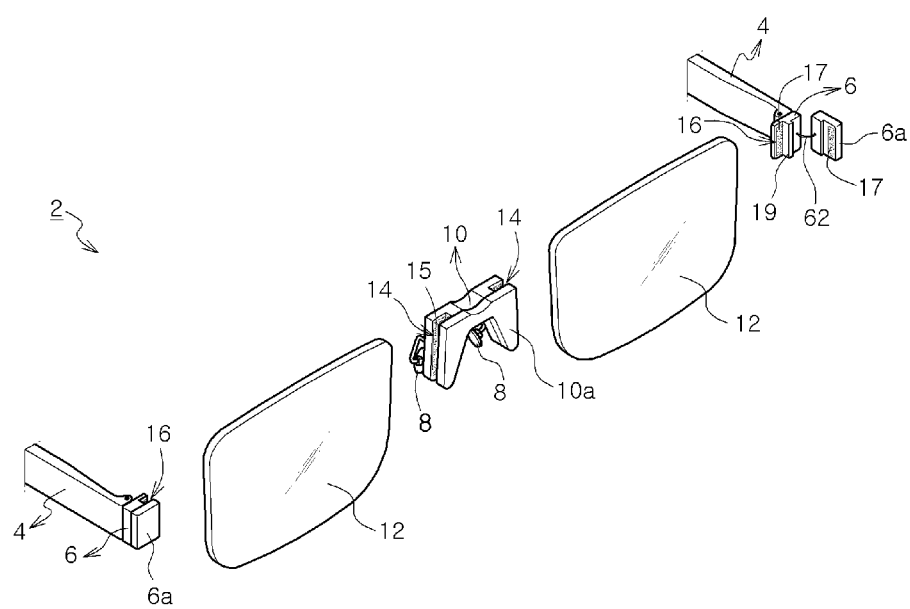
FIG. 19 is an exploded perspective view of essential parts of FIG. 18.
Figure 20:
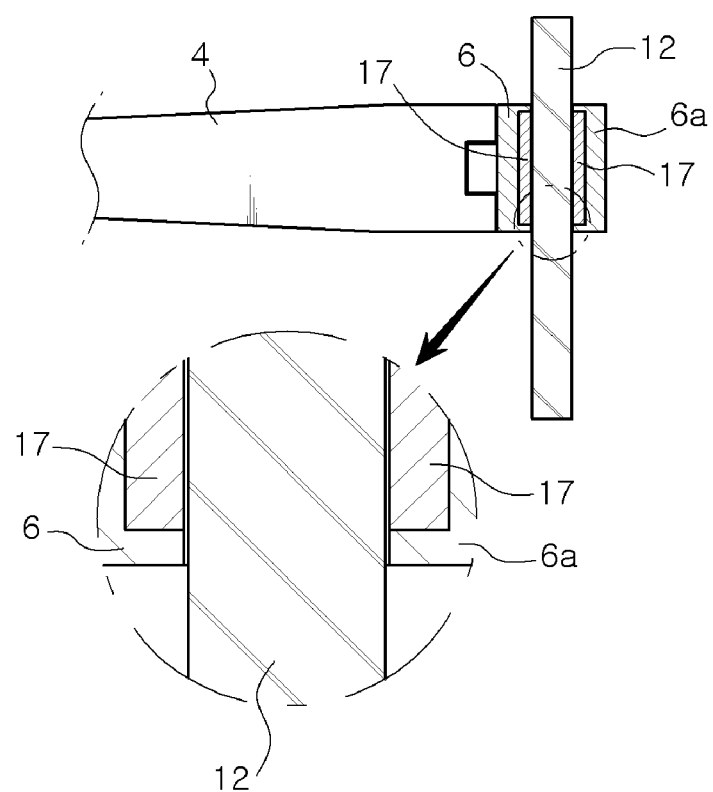
FIG. 20 is a vertically sectional view of a lens connection head part of FIG. 18.

FIG. 18 is a perspective view of self-customized glasses 2 according to a fourth preferred embodiment of the present invention, FIG. 19 is an exploded perspective view of essential parts of FIG. 18, and FIG. 20 is a vertically sectional view of a lens connection head part 6 of FIG. 18. Furthermore, FIG. 21(A) is a plan sectional view of a lens connection head part 6 of the self-customized glasses according to the fourth preferred embodiment of the present invention and FIG. 21(B) is a partially plan sectional view of a bridge part of the self-customized glasses according to the fourth preferred embodiment of the present invention.

Additionally, FIGS. 22 to 26 illustrate a fifth preferred embodiment of the present invention, and FIGS. 18 to 21 illustrate a structure related with the sixth preferred embodiment of the present invention and are an example of a modification of the fourth preferred embodiment related with FIGS. 18 to 23.

The self-customized glasses 2 according to the fourth to sixth preferred embodiment of the present invention adopt disassemblable self-assembly type self-customized rimless glasses as a basic form. As a modification, there are self-customized glasses having a glasses frame (See FIGS. 33 and 34).

The self-customized glasses 2 according to the fourth preferred embodiment illustrated in FIGS. 18 and 19 adopts a form that lenses are connected by magnetism without any glasses frame. The self-customized glasses 2 according to the fourth preferred embodiment include right and left temples 4, right and left lens connection head parts 6 hinge-connected to the right and left temples 4, a bridge part 10 having nose pads 8 and commonly connecting right and left lenses 12, and a pair of the lenses 12. The parts are disassemblable, and are assembled and fixed by magnetism.

As shown in FIGS. 18 to 21, a magnet fixing member 6a for the head part, in which a magnet 17 is buried, is disposed at the lens connection head part 6, in which a magnet 17 is buried, to form a pair with the lens connection head part 6. In addition, a magnet fixing member 10a for the bridge part, in which a magnet 15 is buried, is disposed at the bridge part 10, in which a magnet 15 is buried, to form a pair with the bridge part 10.

Figure 21:
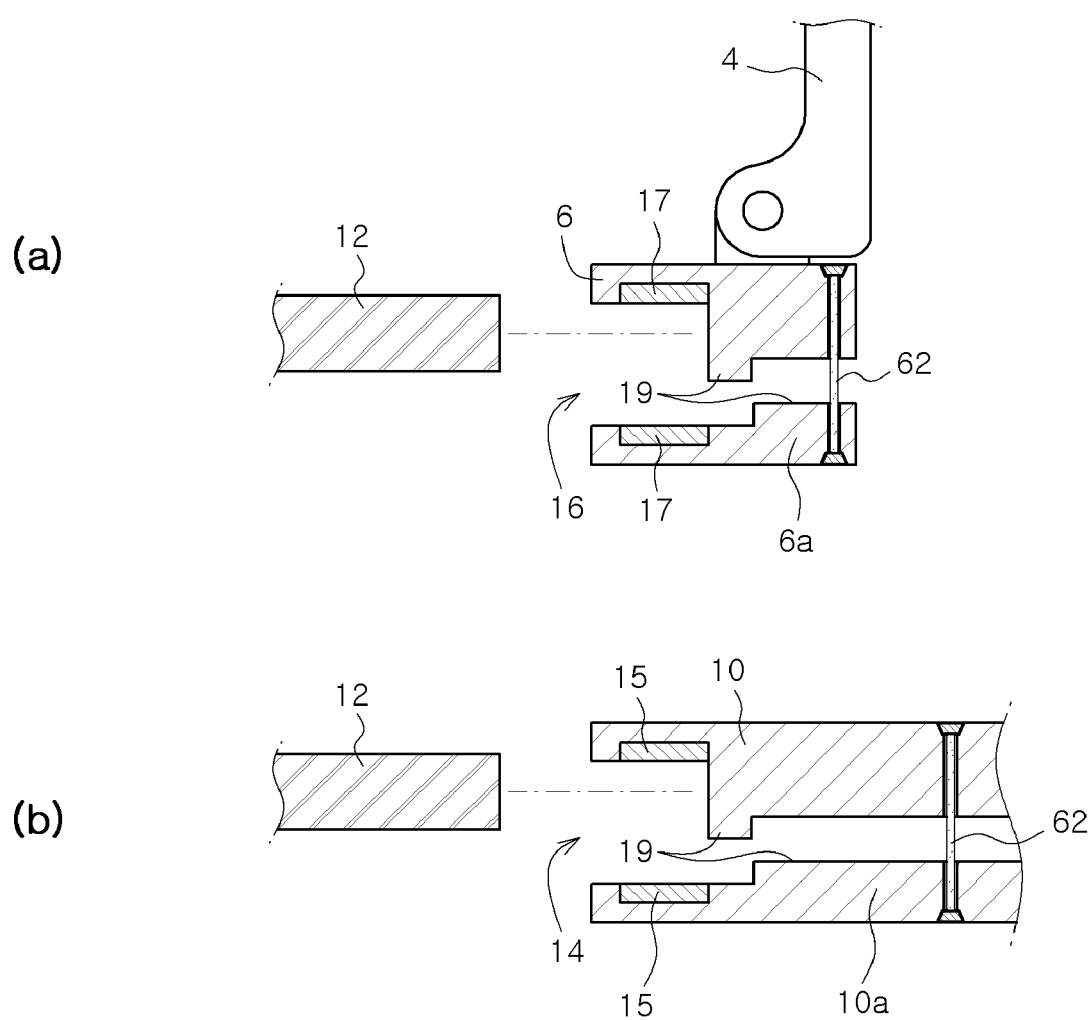
FIG. 21 is a partially plan sectional view of a lens connection head part and a bridge part of self-customized glasses according to the fourth preferred embodiment of the present invention.

Because the magnet fixing member 6a for the head part and the magnet fixing member 10a for the bridge part are made in an independent form, they are well attached and fixed to the magnet 17 buried in the lens connection head part 6 and the magnet 15 buried in the bridge part in pairs by magnetism. However, because it is feared that they are lost, if necessary, as shown in FIGS. 19 and 21, the magnet fixing member 6a for the head part and the magnet fixing member 10a for the bridge part may be suspended on the corresponding lens connection head part 6 and the corresponding bridge part 10 by elastic or nonelastic connection cords 62.

Therefore, in the self-customized glasses 2 according to the third preferred embodiment of the present invention, an edge of one side of the lens 12 is supported and fixed by magnetism of the magnet 17 buried in the lens connection head part 6 and the magnet 17 of the magnet fixing member 6a for the head part, and an edge of the other side of the lens 12 is supported and fixed by magnetism of the magnet 15 buried in the bridge part 10 and the magnet 15 of the magnet fixing member 10a for the bridge part.

In the fourth preferred embodiment of the present invention, the lens 12 may further include a scratch-resistant and fingerprint-resistant coated layer which is formed at an edge of the lens 12 and does not require magnetic fragment, such as iron cores, attachable to a magnet.

As another example to have scratch-resistance at the edge of the lens 12, a scratch preventive coating layer made of a urethane-like material may be formed on an inner surface of the lens connection head part 6, which comes into contact with the lens 12, and the magnet fixing member 6a for the head part.

Additionally, magnetically attached groove parts 16 and 14 are disposed at the lens connection head parts 6 and the bridge part 10 to receive and support the right and left lenses when approaching so that attraction by magnetic force acts between the magnet fixing members 6a for the head part and the magnet fixing members 10a for the bridge part. A stepwise matching uneven part 19 is formed to promote matching between the magnet fixing members 6a for the head part and between the magnet fixing members 10a for the bridge part.

In case of the self-customized glasses 2 according to the fifth preferred embodiment illustrated in FIGS. 18 to 21, the lenses 12 are stably inserted between the lens connection head parts 6 of the temples 4 and the bridge part 10 using the magnetically attached groove parts 16 and 14 and the matching uneven part 19 and are fixed by magnetism. The wearer can adjust a vertical height of the lenses 12 according to the wearer's taste.

FIGS. 22 to 26 are related with the fifth preferred embodiment of the present invention, and are a modification of the fourth preferred embodiment illustrated in FIGS. 18 to 21. In the modification illustrated in FIGS. 22 to 26, the matching uneven part 19 of the fourth preferred embodiment is omitted.

Figure 22:
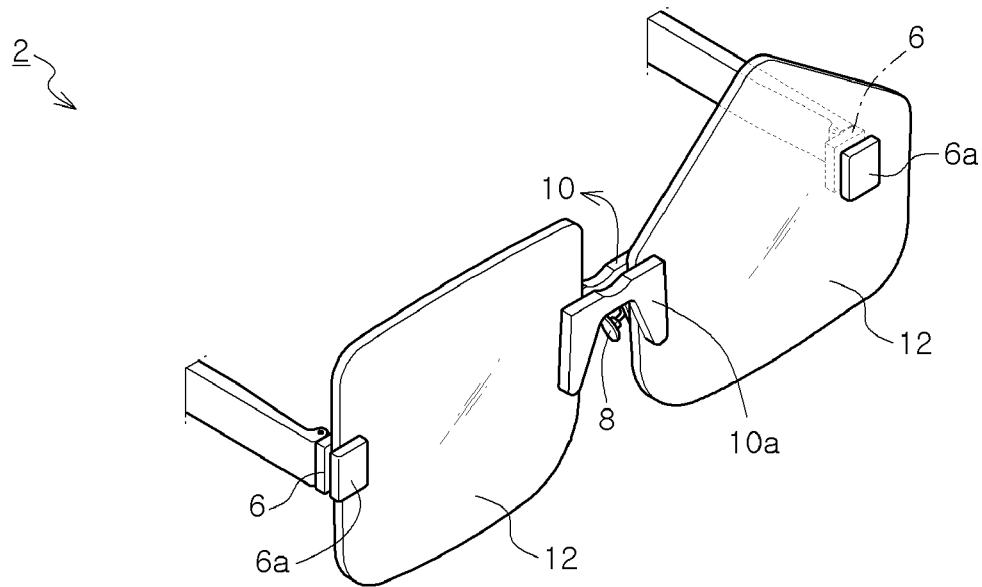
FIG. 22 is a perspective view showing an assembled state of self-customized glasses according to a fifth preferred embodiment of the present invention.
Figure 23:
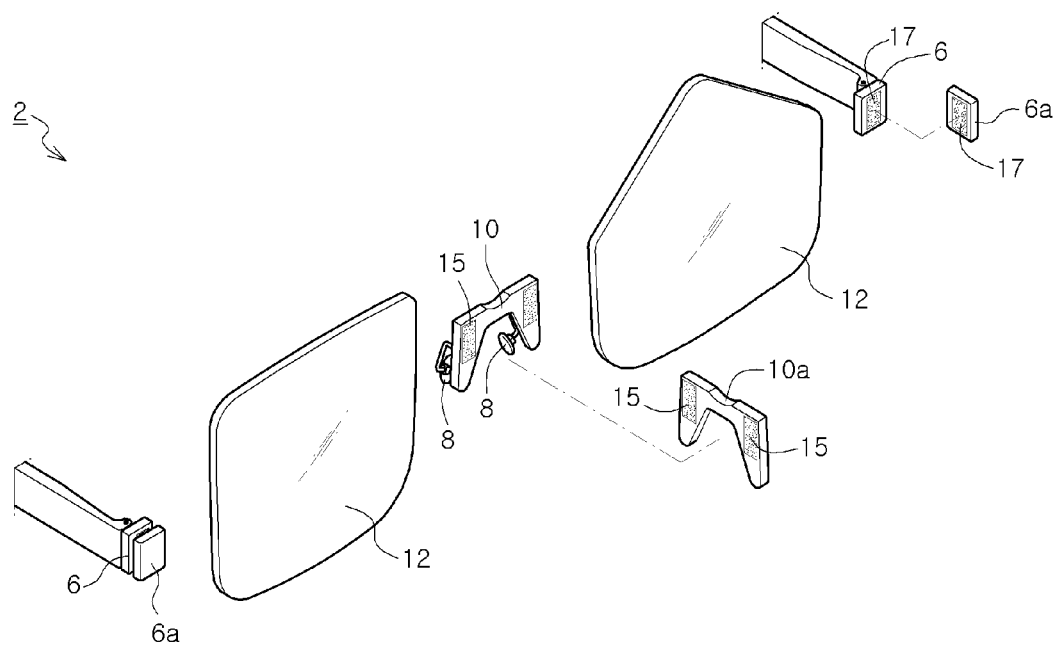
FIG. 23 is an exploded perspective view of essential parts of the self-customized glasses according to the fifth preferred embodiment of the present invention.
Figure 24:
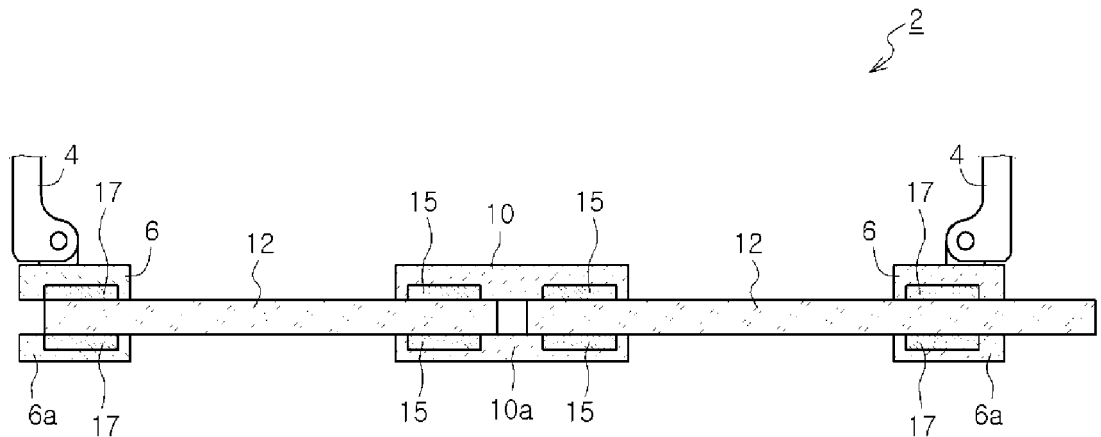
FIG. 24 is a vertically sectional view of a lens connection head part of the self-customized glasses according to the fifth preferred embodiment of the present invention.
Figure 25:
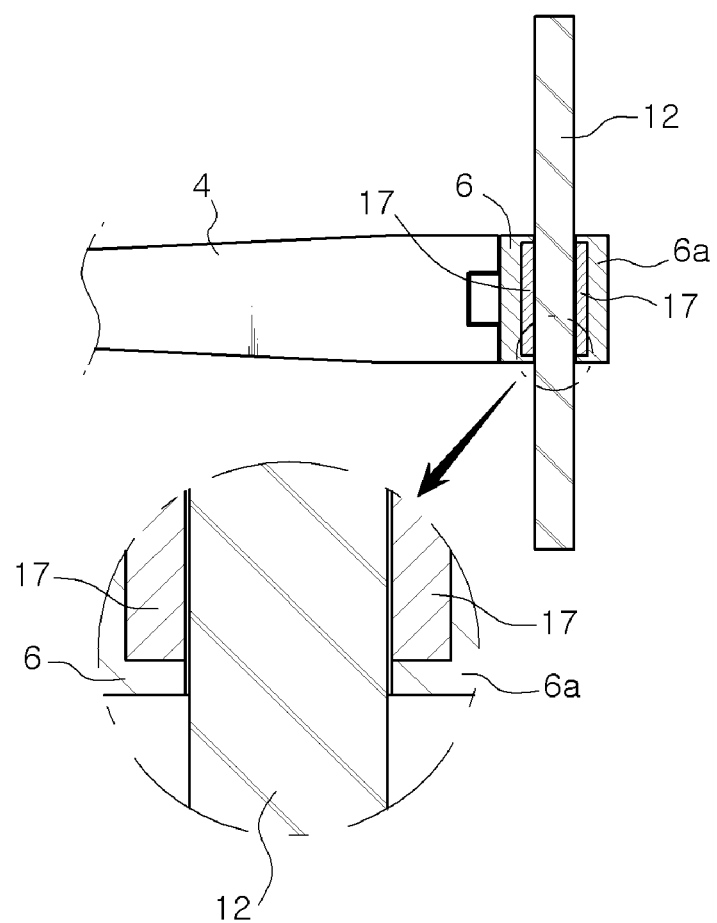
FIG. 25 is a partially exploded view, in a plan section, of the lens connection head part and a bridge part of the self-customized glasses according to the fifth preferred embodiment of the present invention.
Figure 26:
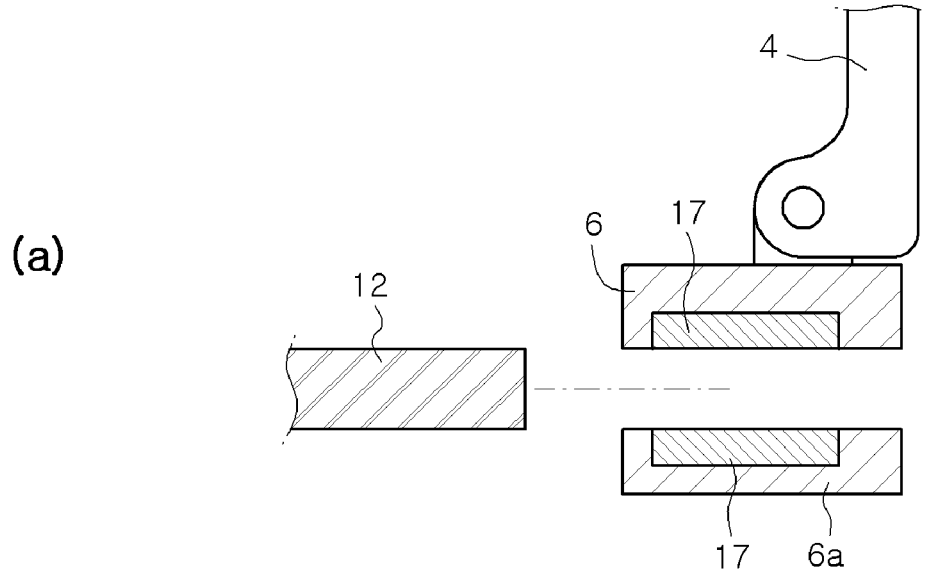
FIG. 26 is a plan sectional view of the self-customized glasses according to the fifth preferred embodiment of the present invention.
Figure 26:
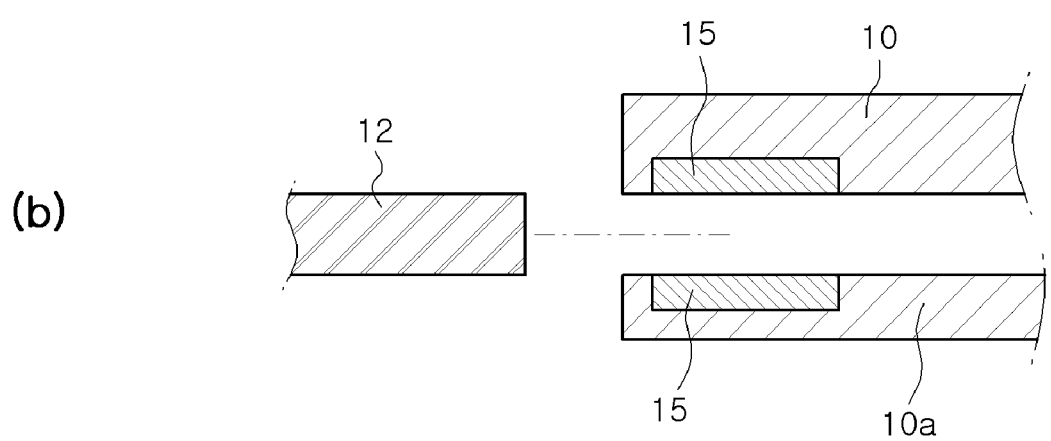

FIG. 22 is a perspective view showing an assembled state of self-customized glasses according to the fifth preferred embodiment of the present invention, FIG. 23 is an exploded perspective view of essential parts of the self-customized glasses 2 according to the fifth preferred embodiment of the present invention, FIG. 24 is a vertically sectional view of the lens connection head part 6 of the self-customized glasses 2 according to the fifth preferred embodiment of the present invention, FIG. 25 is a partially exploded view, in a plan section, of the lens connection head part 6 and the bridge part 10 of the self-customized glasses 2 according to the fifth preferred embodiment of the present invention, and FIG. 26 is a plan sectional view of the self-customized glasses 2 according to the fifth preferred embodiment of the present invention.

In the fifth preferred embodiment of the present invention, as shown in FIGS. 22 to 26, a magnet fixing member 6a for the head part, in which a magnet 17 is buried, is disposed at the lens connection head part 6, in which a magnet 17 is buried, to form a pair with the lens connection head part 6. In addition, a magnet fixing member 10a for the bridge part, in which a magnet 15 is buried, is disposed at the bridge part 10, in which a magnet 15 is buried, to form a pair with the bridge part 10. Moreover, the inner faces of the lens connection head parts 6 and the magnet fixing members 6a for the head parts do not have the uneven structure, namely, the matching uneven parts 10, but is flat to get in surface contact with each other. Furthermore, the lens connection head parts 6 and the magnet fixing members 6a for the head parts do not have the connection cords 62 and the magnetically attached groove parts 16 and 14.

In such a fifth preferred embodiment of the present invention, because the lenses 12 are free from the glasses frame and the magnetically attached groove parts 16 and 14, as shown in FIGS. 22 and 23, the right and left lenses 12 may have different forms, shapes and sizes from each other.

Moreover, the wearer can set fixing positions on the lenses 12, namely, a magnetically fixing position between the lens connection head part 6 and the magnet fixing member 6a for the head part and a magnetically fixing position between the bridge part 10 and the magnet fixing member 10a for the bridge part. In FIG. 22, one (right side in the drawing) among the lenses 12 has the magnetically fixing position at an edge near to a lens core portion, differently from the other lens 12.

the wearer can freely select lenses 12 according to his or her individuality or surrounding environment or situations. That is, the wearer may select lenses in the same shape, size and color, but may select lenses in different shapes, sizes and colors, and freely assemble and disassemble the glasses components and change lens attachment positions.

Figure 27:
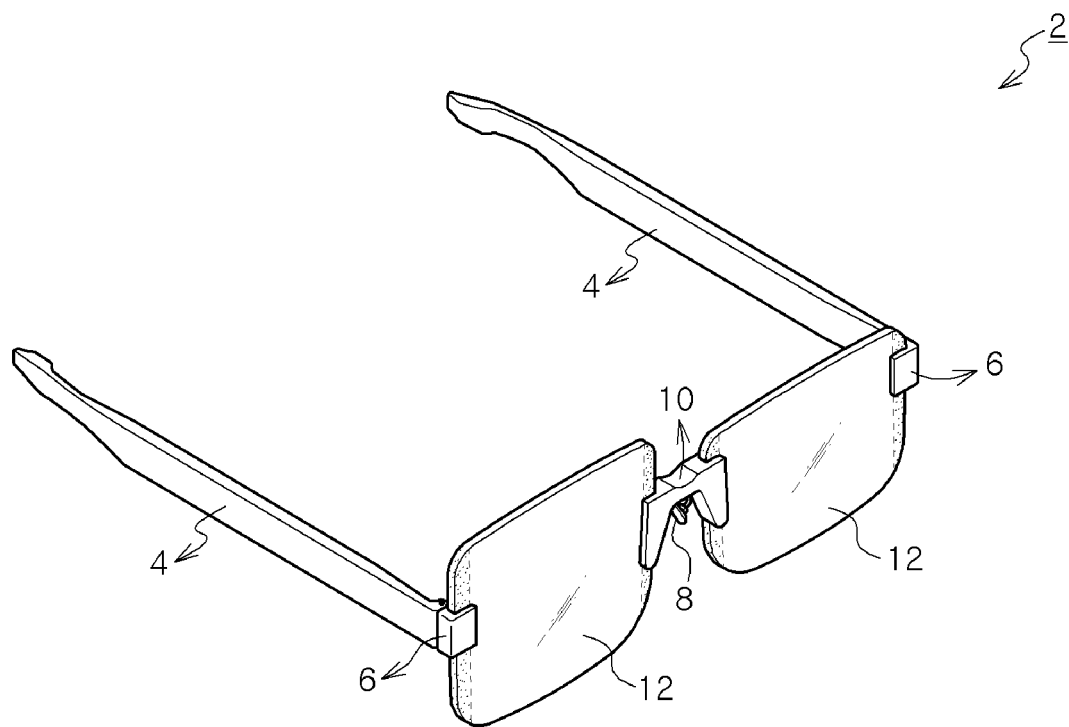
FIG. 27 is a perspective view showing an assembled state of self-customized glasses according to a sixth preferred embodiment of the present invention.
Figure 28:
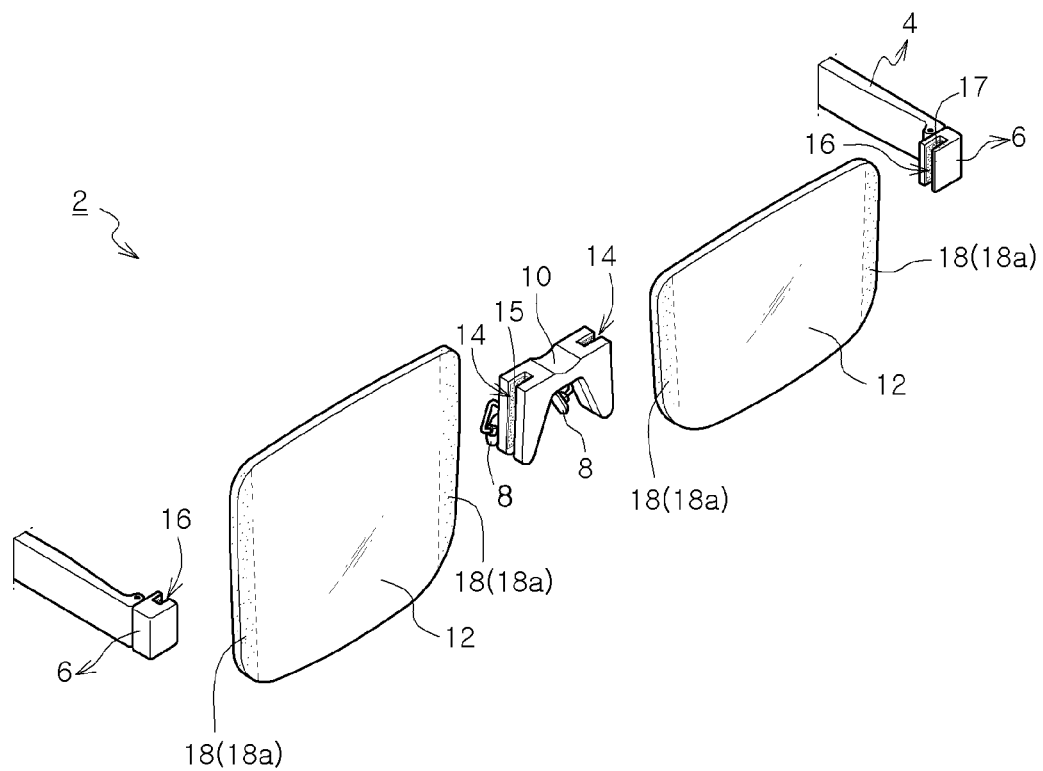
FIG. 28 is an exploded perspective view of FIG. 27.
Figure 29:
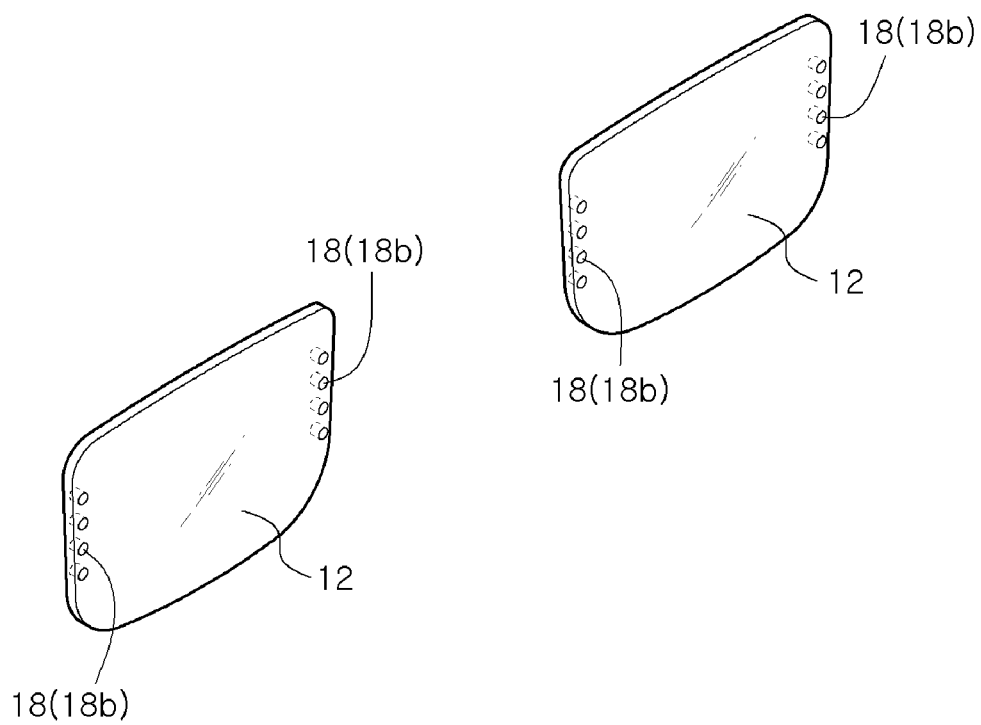
FIG. 29 is a view showing a modification of the self-customized glasses according to the sixth preferred embodiment of the present invention.

FIG. 27 is a perspective view showing an assembled state of self-customized glasses 2 according to a sixth preferred embodiment of the present invention, FIG. 28 is an exploded perspective view of FIG. 27, and FIG. 29 is a view showing a modification of the lenses 12 of the self-customized glasses according to the sixth preferred embodiment of the present invention. Additionally, FIG. 30 is a side sectional view of the self-customized glasses, which fix glass lenses by magnetism, illustrated in FIG. 27, FIG. 31 is a side sectional view is a side sectional view of the self-customized glasses, which fix glass lenses 12 by magnetism, illustrated in FIG. 29, and FIG. 32 is a fragmentary plan sectional view of a lens connection head part 6 and a bridge part 10 of the self-customized glasses 2 according to the sixth preferred embodiment of the present invention.

In the self-customized glasses 2 according to the sixth preferred embodiment of the present invention, the bridge part 10 includes magnetically attached groove parts 14 formed at right and left side walls thereof so that lenses 12 are inserted into the magnetically attached groove parts 14 to be fixed by magnetism, and magnets 15 buried in inner walls of the magnetically attached groove parts 14. Moreover, the right and left lens connection head parts 6 hinge-connected with the temples 4 include magnetically attached groove parts 16 formed at inner walls thereof so that outer portions of the right and left lenses 12 are inserted into the magnetically attached groove parts 16 to be fixed by electric power, and magnets 17 buried in inner walls of the magnetically attached groove parts 16.

Figure 30:
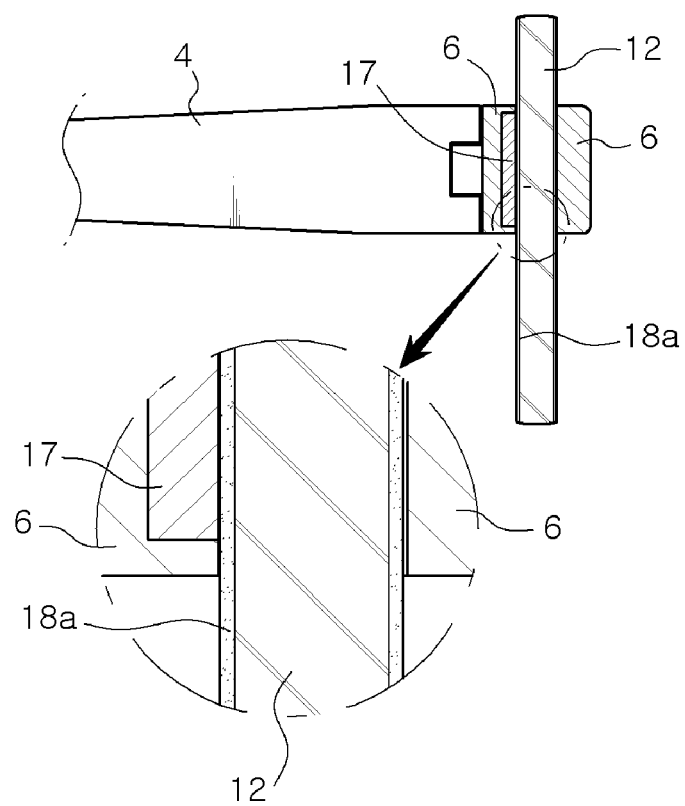
FIG. 30 is a side sectional view of the self-customized glasses, which fix glass lenses by magnetism, illustrated in FIG. 27.
Figure 31:
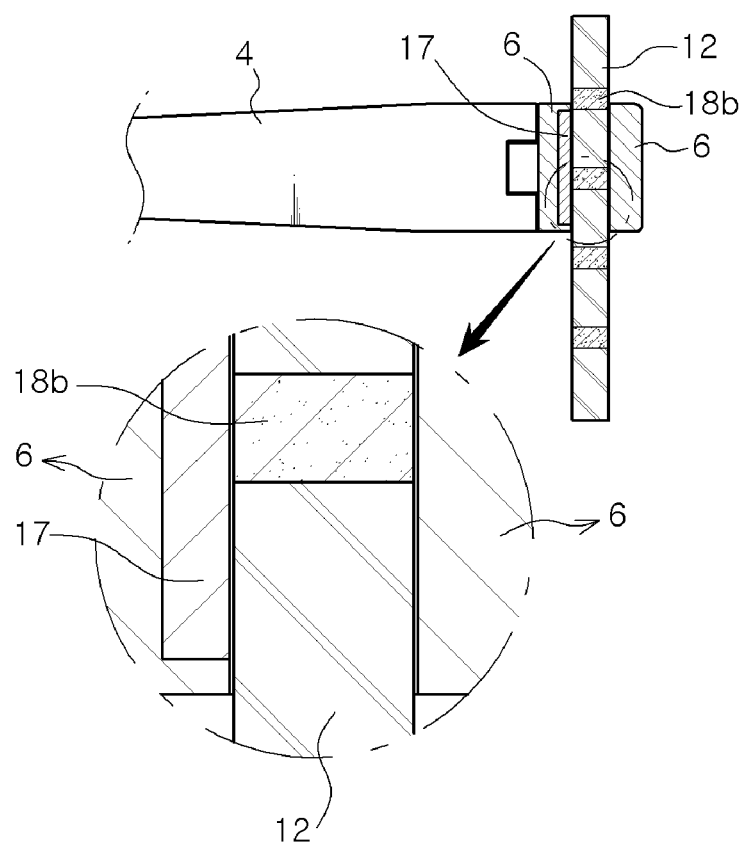
FIG. 31 is a side sectional view is a side sectional view of the self-customized glasses, which fix glass lenses by magnetism, illustrated in FIG. 29.
Figure 32:
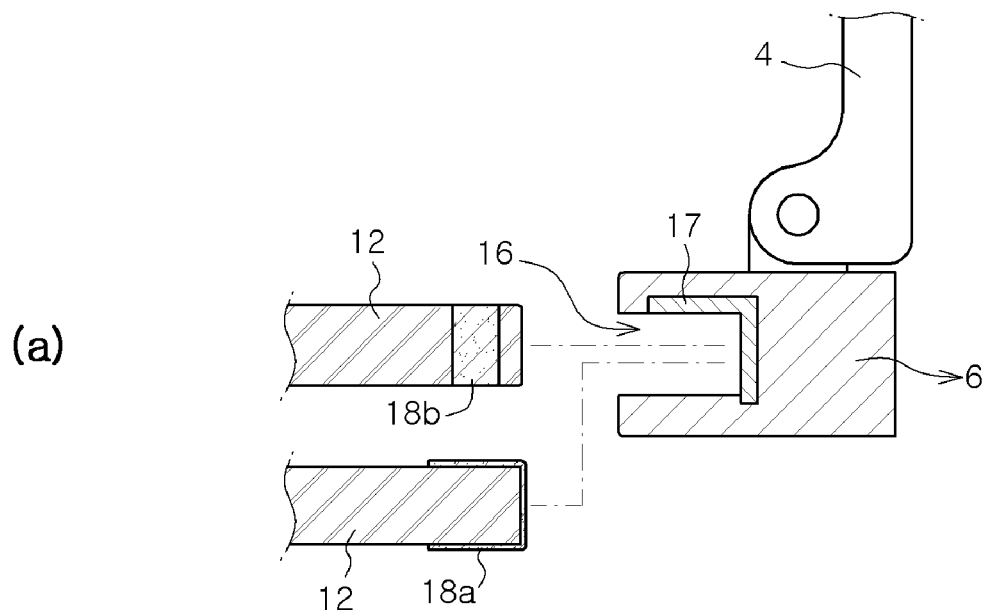
FIG. 32 is a fragmentary plan sectional view of a lens connection head part and a bridge part of the self-customized glasses according to the sixth preferred embodiment of the present invention.
Figure 32:
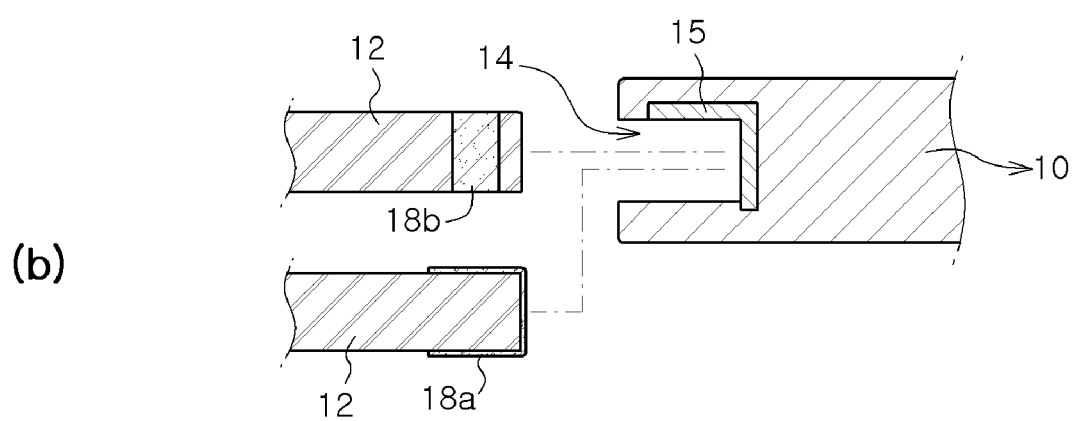

FIGS. 28, 30 and 31 illustrate that the magnets 15 and are buried in the inner walls of the magnetically attached groove parts 14 and 16, but they may be buried in the inner walls of front and rear opposite sides of the magnetically attached groove parts 14 and 16 or may be buried to the inner walls of the core parts of the magnetically attached groove parts 14 and 16.

Furthermore, the magnets 15 and 17 may adopt a magnet fragment form or may adopt a form that magnet powder is mixed with resin if the bridge part 10 or the lens connection head parts 6 are made of a resin material.

FIGS. 28 and 30 illustrate that each of the magnets 17 buried in the inner wall of the magnetically attached groove part 17 of the lens connection head part 6 is buried in the inner wall part of one side of the magnetically attached groove part 17 and the inner wall part of the core part (See FIG. 32), but if necessary, the magnet 17 may be buried in the front inner wall part of the magnetically attached groove part 17.

Right and left end portions of the lenses 12 are attached to the magnetically attached groove part 17 of the lens connection head part 6 and the magnetically attached groove part 14 of the bridge part 10 without support of the glasses frame. In order to achieve the above, magnetic members 18 for magnetic attachment are disposed at right and left end portions of the lens 12.

FIG. 28 illustrates transparent magnet films 18a as the magnetic members 18 disposed at the right and left end portions of the lens 12, and the transparent magnet films 18a extend vertically in a band shape.

The transparent magnet films 18a extended and coated vertically in the band shape as the magnetic members 18 illustrated in FIG. 28 may be cobalt-added titanium dioxide ($Co:TiO_2$) that cobalt atoms of several percent (%) (less than 1 to 10%) having the magnetic property are added to titanium dioxide ($TiO_2$), and the cobalt-added titanium dioxide ($Co:TiO_2$) film does not lose magnetism not only at room temperature but also at high temperature and is almost transparent with respect to visible light. The transparent magnet films 18a made of ($Co:TiO_2$) is a ferromagnetic body at room temperature.

FIG. 29 illustrates magnetic members 18 disposed at right and left end portions of the lens 12. In FIG. 3, a plurality of magnets or a plurality of magnetic fragments 18b like metal cores are planted and arranged vertically.

FIG. 30 is a side sectional view of the self-customized glasses 2 in which the transparent magnet film 18a of the lens 12 illustrated in FIG. 28 is fixed to the magnet 17 buried in the inner wall of the magnetically attached groove part 16 of the lens connection head part 6, and FIG. 31 is a side sectional view of the self-customized glasses 2 in which the magnetic fragment 18b of the lens 12 illustrated in FIG. 29 is fixed to the magnet 17 buried in the inner wall of the magnetically attached groove part 16 of the lens connection head part 6.

The self-customized glasses 2 according to the sixth preferred embodiment is completely assembled in such a way that the lens 12 is inserted between the lens connection head part 6 of the temple 4 and the bridge part 10 and is attached and fixed by magnetism without any glasses frame.

FIG. 32(A) is a plan sectional view showing a state that the lens 12 is inserted into the magnetically attached groove part 16 formed in the lens connection head part 6 of the temple 4 and is fixed by magnetism, and FIG. 32(B) is a plan sectional view showing a state that the lens 12 is inserted into the magnetically attached groove part 14 formed in the bridge part 10 and is fixed by magnetism.

In the sixth preferred embodiment of the present invention illustrated in FIGS. 27 to 32, the lenses 12 may be attached by magnetism using the magnetic members 18 formed in the magnetically attached groove parts 16 and the lenses 12.

In case of the self-customized glasses 2 described referring to FIGS. 18 to 32, when the lenses 12 are inserted between the lens connection head parts 6 of the temples 4 and the bridge part 10 and are attached and fixed by magnetism, the wearer can adjust the vertical height of the lenses 12 according to the wearer's taste.

Because the lenses 12 are free from the glasses frame, the shape and form of the lenses may be varied, the wearer can freely select lenses 12 according to his or her individuality or surrounding environment or situations. That is, the wearer may select lenses in the same shape, size and color, but may select lenses in different shapes, sizes and colors, and freely assemble and disassemble the glasses components.

Figure 33:
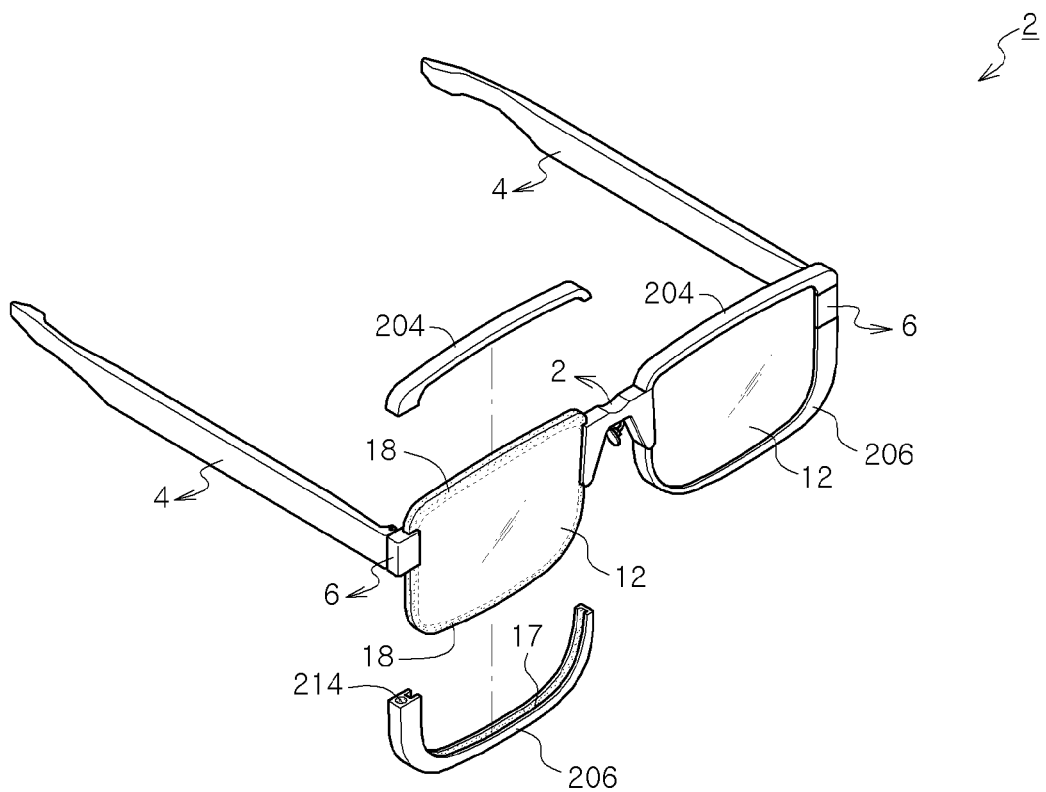
FIG. 33 is a view showing an example of half-rim glasses or full-rim glasses according to a modification of the fourth embodiment of the present invention.
Figure 34:
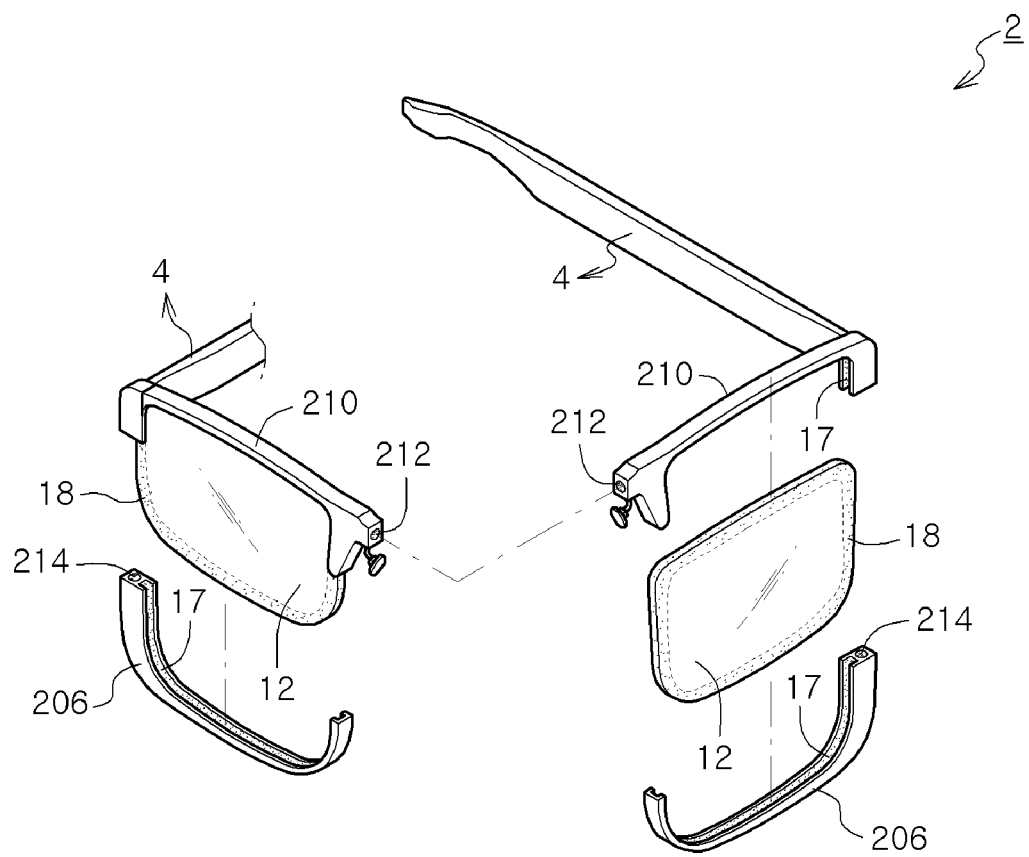
FIG. 34 is an exploded perspective view of self-customized glasses according to a seventh preferred embodiment of the present invention.

Moreover, as shown in FIG. 33, the self-customized glasses 2 may be expressed into half-rim glasses or full-rim glasses by fitting self-assembly frames 204 and 206 to at least one among the upper portion and the lower portion of the lens 12.

As described above, the self-customized glasses according to the present invention may become rimless glasses in response to the trend of glasses of which the frame is not expressed, or, as occasion demands, a half-rim or full-rim shaped frame may be assembled.

Meanwhile, in the embodiments which do not have the transparent micro LED display skins 20, the temples 4, the lenses 12, and the bridge part 10 are in a self-assembly type. However, the self-customized glasses 2 according to the seventh preferred embodiment illustrated in FIG. 34 has right and left half-rim frames 210 connected with the temples 4, and the bridge part has cut surfaces. Magnets 212 are buried in the cut wall surfaces of the bridge part in order to make the right and left half-rim frames 210 attached to each other by magnetism. The lenses 12 are attached and fixed to fitting grooves of the right and left frames 210 by magnetism.

In more detail, the self-customized glasses 2 according to the seventh preferred embodiment has the right and left half-rim frames 210, the bridge part has cut surfaces, and the magnets 212 are buried in the cut wall surfaces of the bridge part. The magnetic members 18 are selectively formed on the outer circumferential portion of the lens 12, and a magnet 17 is buried in a fitting groove of the lens 12 of the half-rim frame 210 so as to be attached and fixed by magnetism. If necessary, the self-customized glasses 2 further include a lower assembly frame 206 magnetically attached by the half-rim frames 210 and magnets 214.

The self-customized glasses according to the present invention can be kept in a glasses keeping case, which is smaller than an occupation space of general glasses, so is convenient in keeping and carrying.

FIGS. 35 to 53 relate to self-customized glasses according to eighth and tenth preferred embodiments of the present invention, wherein transparent micro LED display skins 20 are coated on the lenses 12.

As shown in FIGS. 35 to 53, the self-customized glasses according to the eighth and the tenth preferred embodiments of the present invention are glasses of a new concept to provide effects suitable for the wearer's situations since the wearer can form various patterns and colors on the lenses 12 using the transparent micro LED display skins 20 coated on the lenses 12.

Moreover, because the wearer can create designs on the lenses 12 and change colors and patterns of the glasses, the self-customized glasses according to the eighth and the tenth preferred embodiments of the present invention may be only one unique self-customized glasses to allow the wearer to create glasses of a new concept.

Figure 35:
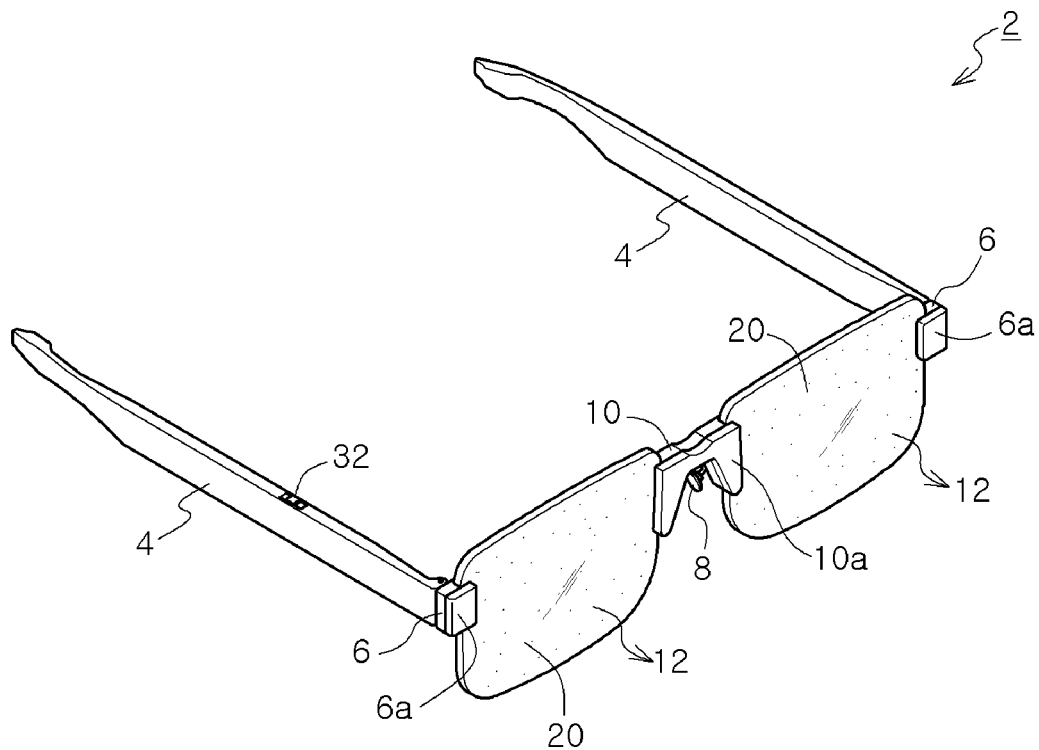
FIG. 35 is a perspective view showing an assembled state of self-customized glasses according to an eighth preferred embodiment of the present invention.
Figure 36:
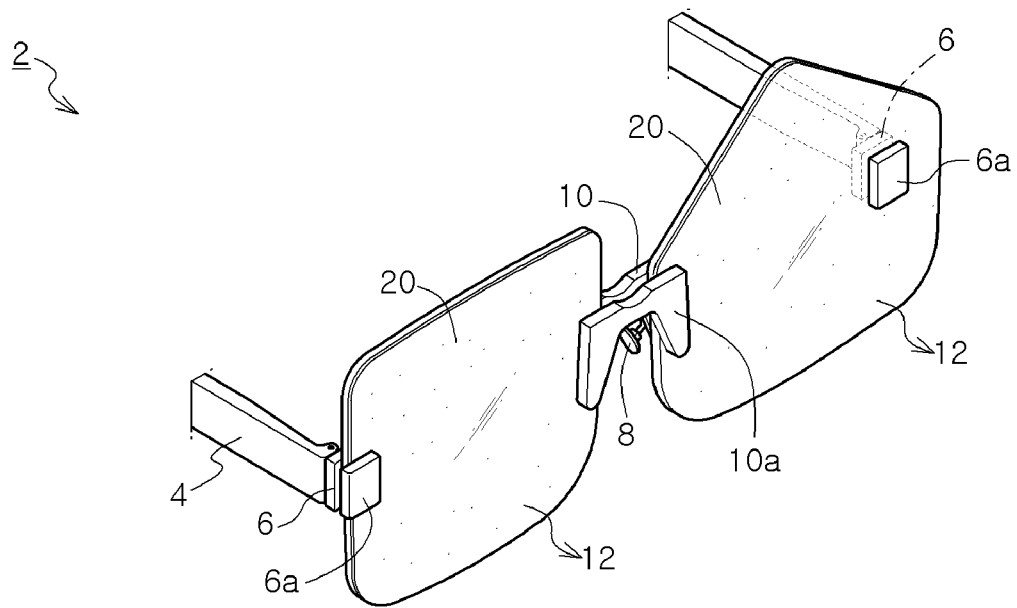
FIG. 36 is an enlarged perspective view of self-customized glasses according to the eighth preferred embodiment of the present invention.
Figure 37:
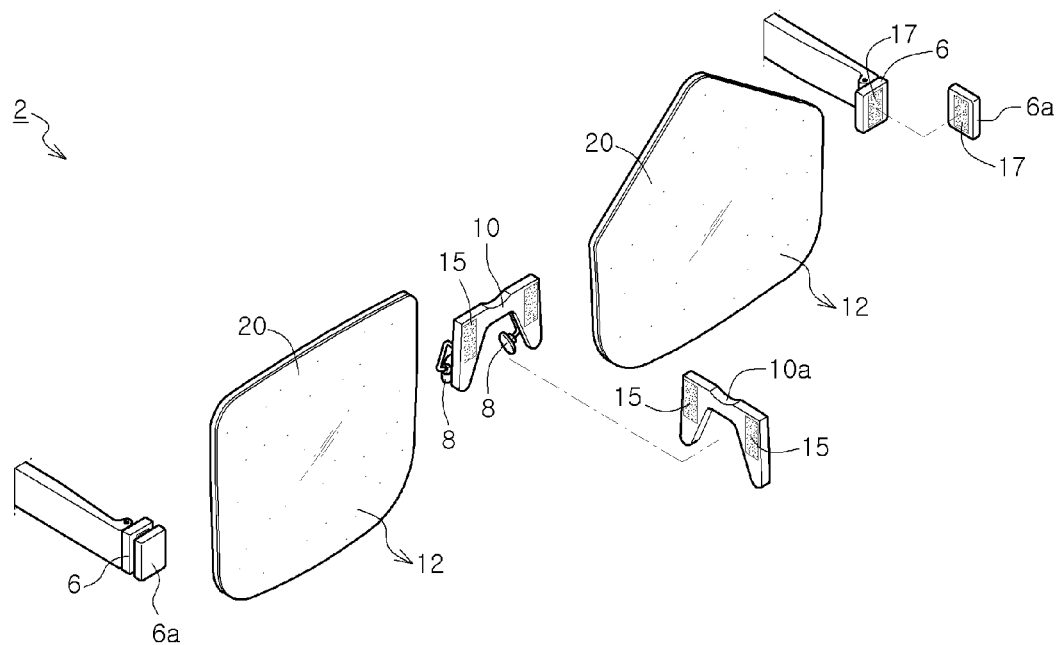
FIG. 37 is an exploded perspective view of FIG. 36.

FIG. 35 is a perspective view showing an assembled state of self-customized glasses 2 according to an eighth preferred embodiment of the present invention, FIG. 36 is an enlarged perspective view of self-customized glasses 2 according to the eighth preferred embodiment of the present invention, and FIG. 37 is an exploded perspective view of FIG. 36.

Figure 38:
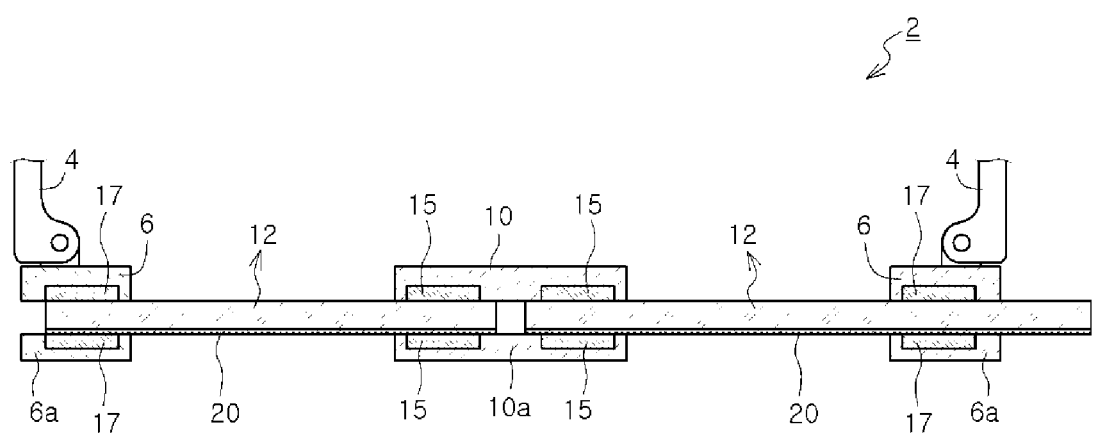
FIG. 38 is a cross sectional view of the self-customized glasses illustrated in FIG. 36.
Figure 39:
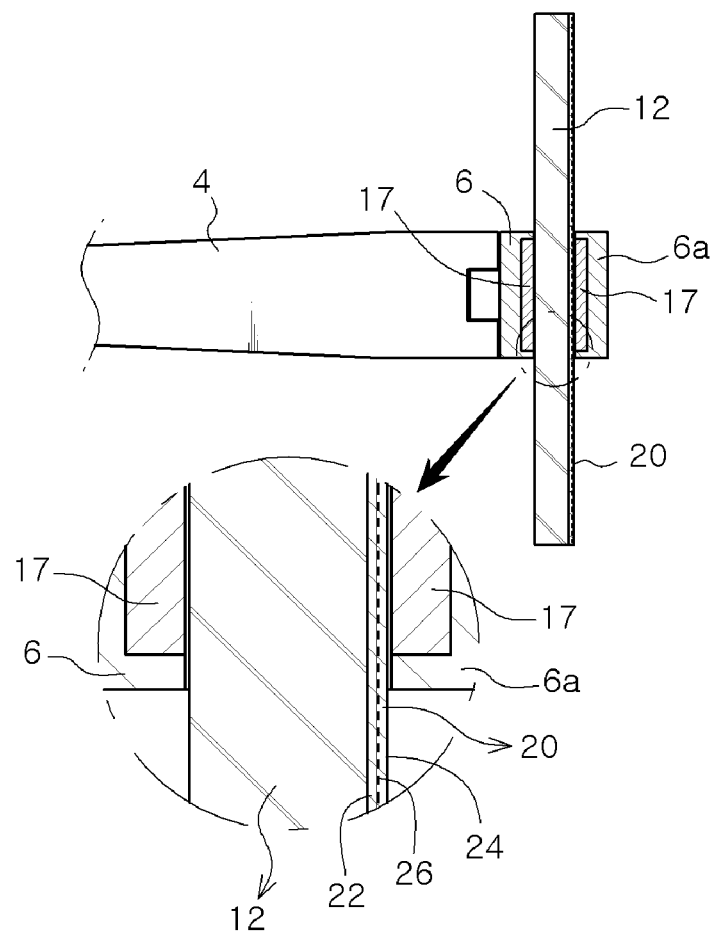
FIG. 39 is a vertical sectional view of a lens connection head part of the self-customized glasses according to the eighth preferred embodiment of the present invention.
Figure 40:
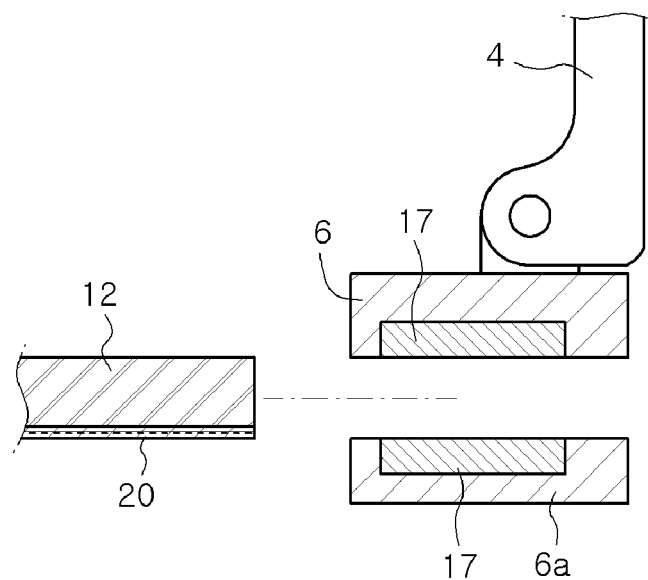
FIG. 40 is a partially exploded view, in a plan section, of the lens connection head part and the bridge part of the self-customized glasses according to the eighth preferred embodiment of the present invention.
Figure 40:
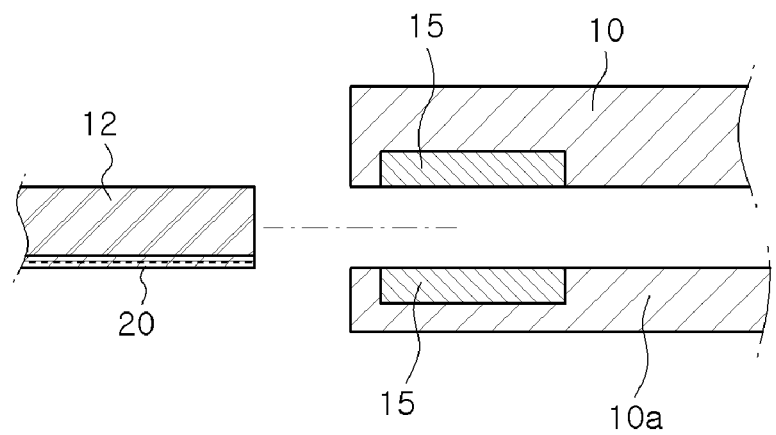

Furthermore, FIG. 38 is a cross sectional view of the self-customized glasses 2 illustrated in FIG. 36, FIG. 39 is a vertical sectional view of the lens connection head part 6 of the self-customized glasses 2 according to the eighth preferred embodiment of the present invention, and FIG. 40 is a partially exploded view, in a plan section, of the lens connection head part 6 and the bridge part 10 of the self-customized glasses 2 according to the eighth preferred embodiment of the present invention.

The self-customized glasses 2 according to the eighth preferred embodiment of the present invention illustrated in FIGS. 35 to 40 are disassemblable self-assembly type self-customized rimless glasses, and the transparent micro LED display skins 20 are coated on the lenses 12.

That is, the self-customized glasses 2 illustrated in FIGS. 35 to 40 are assembled by magnetism without any glasses frame and include right and left temples 4, right and left lens connection head parts 6 hinge-connected to the right and left temples 4, a bridge part 10 having nose pads 8 and connecting right and left lenses 12 with each other, and a pair of lenses 12. The components of the glasses can be assembled, disassembled, and fixed by magnetism.

As shown in FIGS. 35 to 38, a magnet fixing member 6a for the head part, in which a magnet 17 is buried, is disposed at the lens connection head part 6, in which a magnet 17 is buried, to form a pair with the lens connection head part 6. In addition, a magnet fixing member 10a for the bridge part, in which a magnet 15 is buried, is disposed at the bridge part 10, in which a magnet 15 is buried, to form a pair with the bridge part 10.

Because the magnet fixing member 6a for the head part connected with the temple 4 and the magnet fixing member 10a for the bridge part are made in an independent form, they are well attached and fixed to the magnet 17 buried in the lens connection head part 6 and the magnet 15 buried in the bridge part in pairs by magnetism. However, because it is feared that they are lost, if necessary, the magnet fixing member 6a for the head part and the magnet fixing member 10a for the bridge part may be connected by elastic or nonelastic connection cords 62.

Therefore, in the self-customized glasses 2 according to the third preferred embodiment of the present invention, an edge of one side of the lens 12 is supported and fixed by magnetism of the magnet 17 buried in the lens connection head part 6 and the magnet 17 of the magnet fixing member 6a for the head part, and an edge of the other side of the lens 12 is supported and fixed by magnetism of the magnet 15 buried in the bridge part 10 and the magnet 15 of the magnet fixing member 10a for the bridge part.

In the preferred embodiments of the present invention, it has been described that fixation between the lens connection head parts 6 and the lenses 12 and fixation between the bridge part 10 and the lenses 12 are supported and fixed by magnetism, but the support and fixation may be achieved not only by magnetism but also by a forced fitting structure or a retaining structure.

The lenses 12 may be made of glass material, but it is good that the lenses 12 are made of plastic material for glasses, and may further include a scratch-resistant and fingerprint-resistant coated layer, and a hard coating layer having hardness to enhance scratch resistance.

In order to enhance scratch resistance by the magnetic fixation structure at the edge of the lens 2 according to the eighth preferred embodiment, a scratch preventive coating layer made of a urethane-like material may be formed on an inner contact surface of the lens connection head part 6 coming into contact with the lens 12 and an inner contact surface of the magnet fixing member 6a for the head part, or an inner contact surface of the bridge part 10 and an inner contact surface of the magnet fixing member 10a for the bridge part.

When the lenses 12 are located between the lens connection head parts 6 of the temples 4 and the bridge part 10 and are attached and fixed by magnetism, the wearer can adjust a vertical height of the lenses 12 according to the wearer's taste.

Because the lenses 12 are free from the glasses frame, the shape and form of the lenses may be varied, the wearer can freely select lenses 12 according to his or her individuality or surrounding environment or situations. That is, the wearer may select lenses in the same shape, size and color, but may select lenses in different shapes, sizes and colors, and freely assemble and disassemble the glasses components.

In other words, because the lenses 12 are free from the magnetically attached groove parts 16 and 14, shapes, forms and sizes of the lenses 12 may be formed differently at right and left sides as illustrated in FIGS. 36 and 37. Furthermore, the fixing positions on the lenses 12, namely, a magnetic fixing position between the lens connection head parts 6 and the magnet fixing members 6a for the head parts or a magnetic fixing position between the bridge part 10 and the magnet fixing members 10a for the bridge part can be arbitrarily set by the wearer as illustrated in FIGS. 36 to 38.

According to the present invention, the wearer can freely select the lenses 12 according to the wearer's individuality, ambient environment or situations, select shapes or sizes of the right and left lenses as the wearer wants, and form various colors, patterns or designs on the lenses 12 using the transparent micro LED display skins 20 while having the function of the glasses lenses. So, the self-customized glasses according to the present invention can show roles and effects that the wearer wants.

Figure 41:
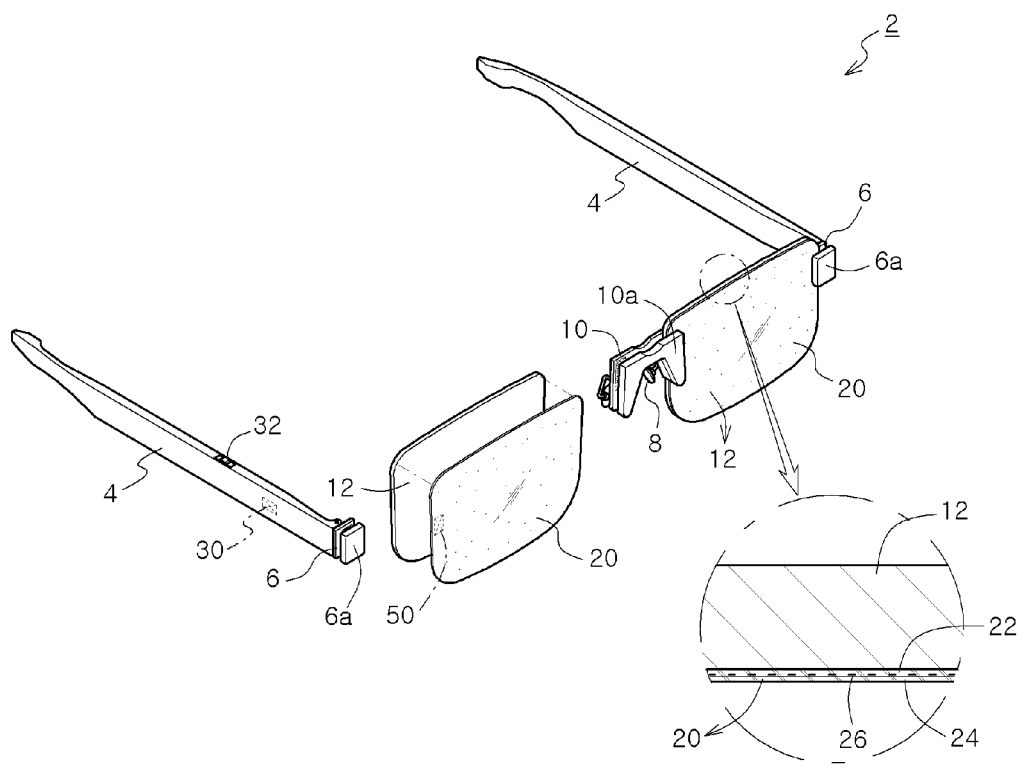
FIG. 41 is a view showing a state where a transparent micro LED display skin is coated on the outer surface of the glass lenses of the self-customized glasses according to the eighth preferred embodiment of the present invention.

FIG. 41 is a view showing a state where the transparent micro LED display skins 20 are coated on the outer surface of the self-customized glasses according to the eighth preferred embodiment of the present invention. The transparent micro LED display skins 20 capable of displaying colors, patterns or designs are adhered on the right and left lenses 12.

Because the lenses 12 coated with the transparent micro LED display skins 20 are independently and easily separable, the wearer can freely select sizes of the right and left lenses and can be replaced with other lenses to which the transparent micro LED display skins 20 are not applied.

The micro LED display is a display that micro LED particles of 5 μm to 100 μm (1/100,000 cm) are stuck on a substrate, is suitable to implement a flexible screen or a rollable screen utilizing LED chips as pixels, is available for a long period of time since being less in power consumption than OLEDs, and is more excellent in intensity of illumination, chroma and power efficiency than the existing OLEDs.

Such a micro LED display is coated and attached to the surface part of the self-customized glasses 2, and includes a transparent substrate 22 having transparency and flexibility in order to show the intrinsic color of the self-customized glasses 2 as it is even though the micro LED display does not work, and micro LED pixels 26 of the micro LED chips having maximized transparency.

Moreover, since the pixels of the transparent micro LED display skins 20 coated on the lenses 12 are controlled to lower screen resolution and arranged, even though the transparent micro LED display skins 20 are operated to show a design or a shape, there is no problem in that the wearer keeps eyes forward.

Therefore, if the transparent micro LED display skins of the lenses 12 do not work, the lenses 12 are used as general glasses lenses 12, but if the transparent micro LED display skins 20 coated on the lenses 12 work, the self-customized glasses 2 can show various designs, colors or functions using the lenses 12, for instance, like sunglasses.

Even though any one among various designs, colors or patterns is displayed on the lenses 12 through the transparent micro LED display skins 20, the wearer can see the outside through the lenses 12 since the skins 20 are transparent.

The self-customized glasses 2 according to the present invention include circuits disposed in the temples 4 or the lenses 12 to actuate the transparent micro LED display skins 20 coated on the lenses 12.

Figure 42:
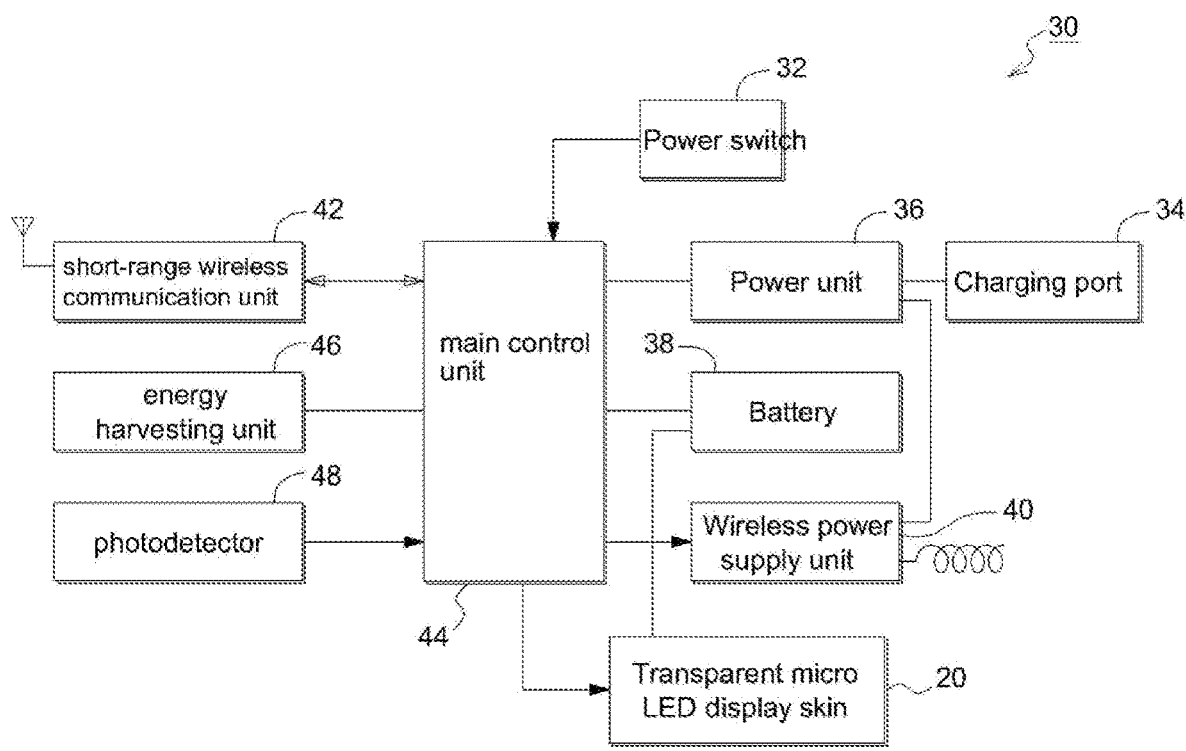
FIG. 42 is a circuit block diagram of a main master part embedded in temples of the self-customized glasses according to the eighth preferred embodiment of the present invention.
Figure 43:
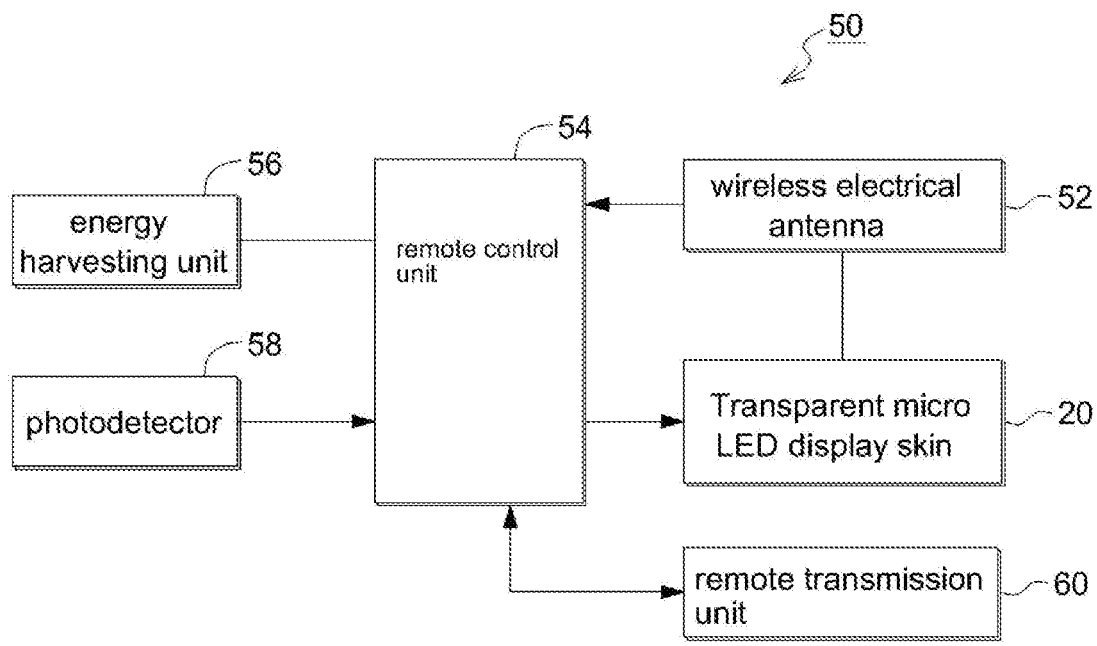
FIG. 43 is a circuit block diagram of a remote slave mounted on the glass lenses of the self-customized glasses according to the eighth preferred embodiment of the present invention.

FIG. 42 is a circuit block diagram of a main master part 430 embedded in temples of the self-customized glasses 2 according to the eighth preferred embodiment of the present invention, and FIG. 43 is a circuit block diagram of a remote slave 50 mounted on the glass lenses 12 of the self-customized glasses 2 according to the eighth preferred embodiment of the present invention.

The structure of the main master part 30 illustrated in FIG. 42 is nearly similar with the structure of the main master part 30 illustrated in FIG. 10. However, the transparent micro LED display skins 20 are coated on the temples 4 of the self-customized glasses 2 in FIG. 10, but are not coated on the temples 4 of the self-customized glasses in FIG. 42.

Additionally, the structure of the remote slave 50 illustrated in FIG. 43 is nearly similar with the structure of the remote slave 50 illustrated in FIG. 11. However, the transparent micro LED display skins 20 are coated on the lens connection head parts 6 and the lenses 12 in FIG. 11, but are not coated on the lenses 12 in FIG. 43.

A photodetector 48 disposed in the lens 12 or the temple 4 detects the quantity of external light applied to the self-customized glasses 2 and transfers the detected result to a main control unit 44 or a remote control unit 54, and the corresponding main control unit 44 or the remote control unit 54 controls brightness of display of the transparent micro LED display skins 20 based on the quantity of light. Brightness of the transparent micro LED display skin 20 around the self-customized glasses 2 may be automatically controlled according to day and night.

The lenses 12 according to the present invention can wirelessly receive electric power by transferring resonant energy based on oscillatory magnetic field, and information of the parts, such as the lens 12, can be transferred to the main master part 30 or the smart phone 60 through the wireless transmission method.

The wireless transmission method between the lens 12 and the main master part 30, the wireless transmission method between the main master part 30 and the smart phone 60, or the wireless transmission method between the lens 12 and the smart phone 60 may use Li-Fi technology realizing rapid transmission speed using the wavelengths of light generated from LEDs, and especially, the micro LED technology according to the present invention promotes miniaturization and weight reduction of the parts.

Therefore, the self-customized glasses 2 according to the present invention can show various designs of glasses suitable for trends these days, and vary colors and designs of the glasses using the transparent micro LED display skins 20 coated on the entire lenses 12.

Figure 44:
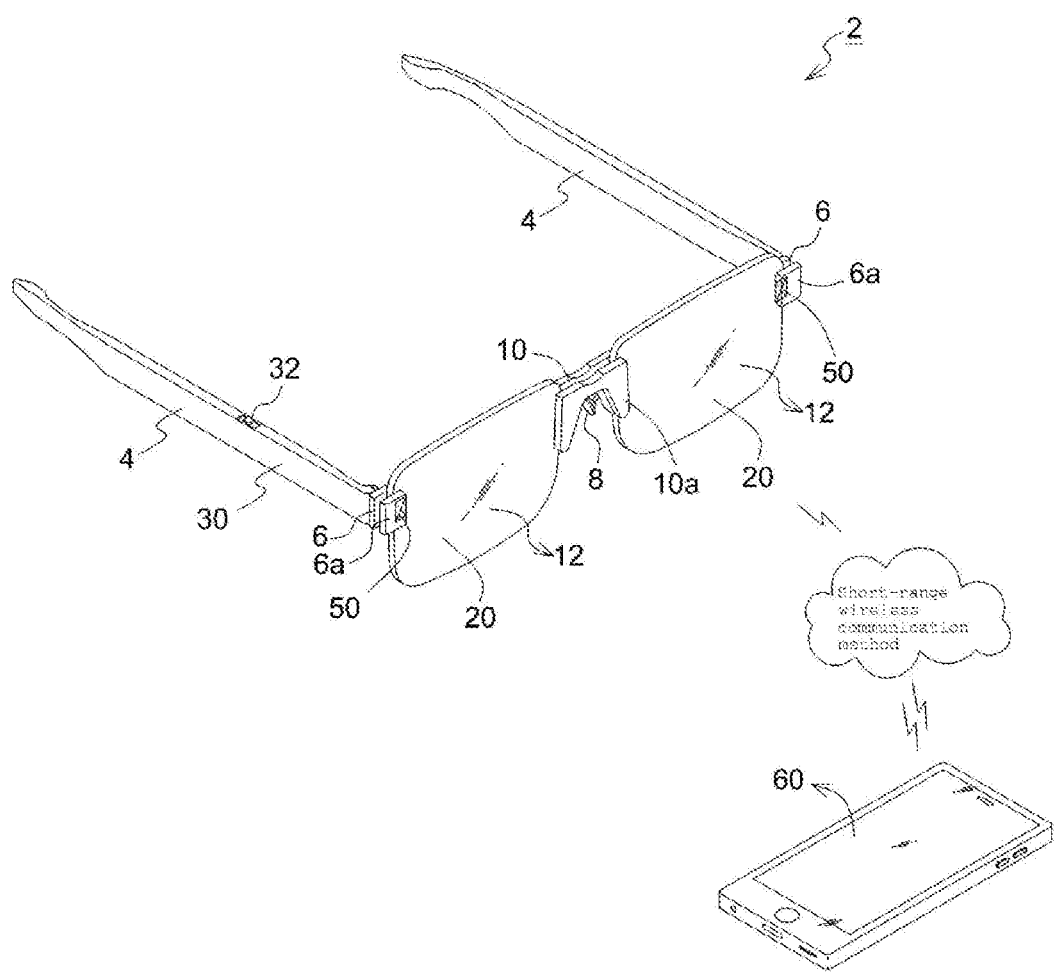
FIG. 44 is a schematic diagram showing a remote control for changing a design and a color of the glass lenses between the self-customized glasses and the smart phone according to the eighth preferred embodiment of the present invention.

FIG. 44 is a schematic diagram showing a remote control for changing a design and a color of the glass lenses 12 between the self-customized glasses 2 and the smart phone 60 according to the eighth preferred embodiment of the present invention.

In the present invention, the main master part 30 of the self-customized glasses 2 can be connected with the smart phone 60 wirelessly using the short-range wireless communication method, such as Bluetooth communication, Wi-Fi communication, NFC communication, IR communication, and Li-Fi communication. In addition, according to the eighth preferred embodiment of the present invention, the main master part 30 can perform wireless control to express various colors and designs on the transparent micro LED display skins 20 of the lenses 12 by operating a mobile application for designs and colors of the self-customized glasses 2 downloaded to the smart phone 60.

Moreover, the self-customized glasses 2 according to the present invention further include a glasses frame 70 serving as roles of an ornament and a magnet fixing member, and the transparent micro LED display skins 20 may be also formed on the glasses frame 70. In this instance, the main master part 30 performs wireless control to display colors and designs of the lenses on the transparent micro LED display skins 20 of the lenses (70 in FIG. 52) of the self-customized glasses 2.

FIGS. 45 to 49 show examples that the micro LED display skins 20 are applied to the lenses 12 to express the overall color or a design of the lenses 12 in an instant.

Figure 45:
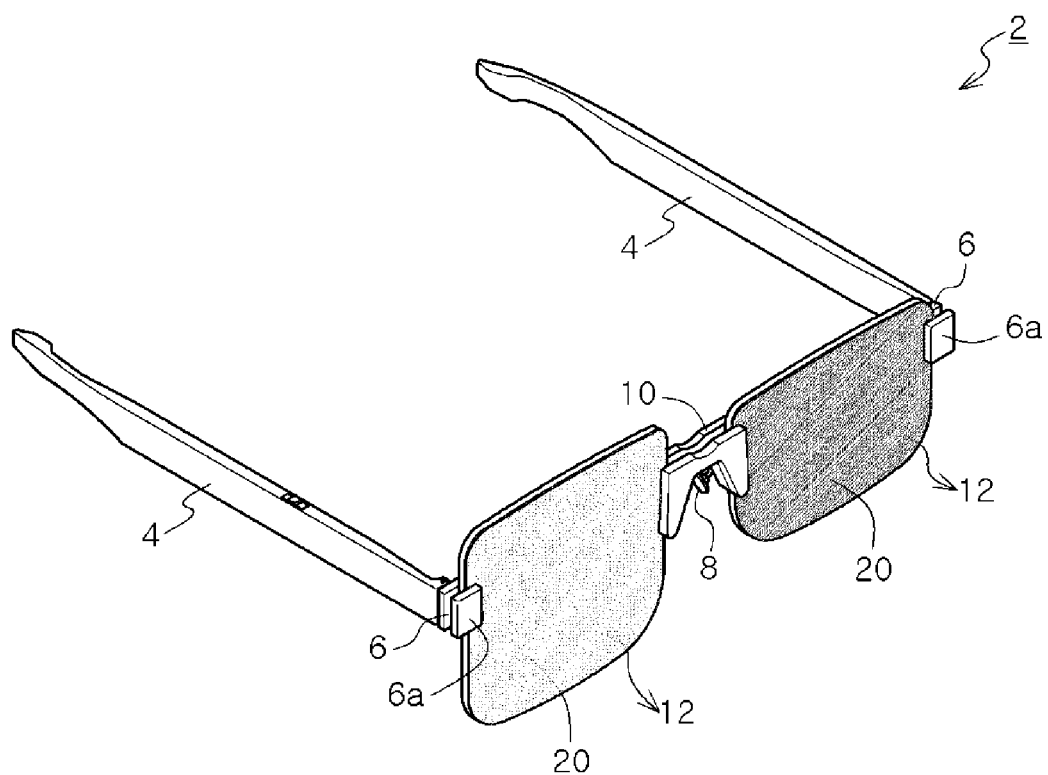
FIG. 45 is a view showing an example of the self-customized glasses which are coated with the same color as sunglasses according to the eighth preferred embodiment of the present invention.

FIG. 45 is a view showing an example of the self-customized glasses 2 of which the lenses 12 are coated with the micro LED display skins 20 having the same color as sunglasses.

If the micro LED display skins 20 of the lenses 12 of the self-customized glasses 2 are expressed in brown color, it provides ultraviolet and infrared cutoff effects, and reduces dazzling and enables the wearer to see thing clearly by preventing scattering of light.

For instance, if the micro LED display skins 20 of the lenses 12 of the self-customized glasses 2 are expressed in light black color, they absorb wavelengths of light evenly to show the original colors, thereby preventing dazzling and enhancing ultraviolet cutoff effect. Furthermore, if the micro LED display skins 20 of the lenses 12 of the self-customized glasses 2 are expressed in yellow color, they lighten the wearer's view, so such self-customized glasses are suitable for wearers who act at night.

Such lenses 12 can allow the wearer to use the glasses for sight protection or sight correction according to surrounding environment, such as at days and nights, on roads, at beaches, or on snowy fields.

Moreover, the wearer can express designs and colors that the wearer wants to express or show to other people through the transparent micro LED display skins 20 of the lenses 12 of the self-customized glasses 2.

Figure 46:
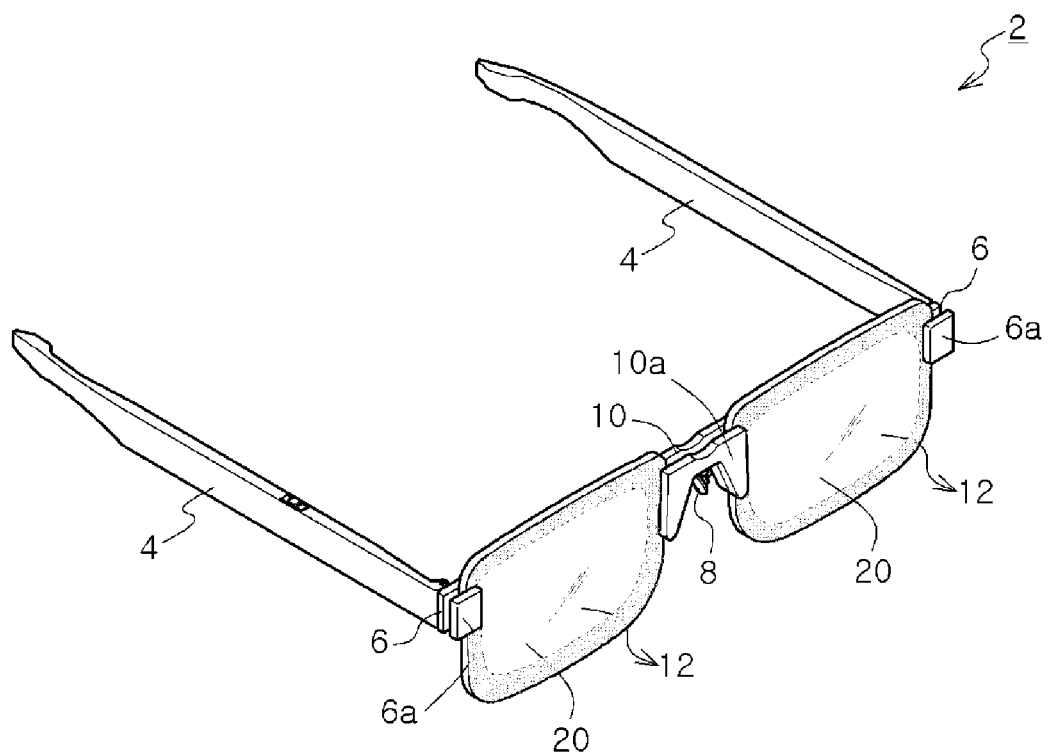
FIG. 46 is a view showing an example of the self-customized glasses that a glasses frame is expressed on the glass lenses according to the eighth preferred embodiment of the present invention.

FIG. 46 is a view showing an example of the self-customized glasses 2 that a glasses frame is expressed on the outer portion of the micro LED display skins 20 of the lenses 12 according to the eighth preferred embodiment of the present invention so as to make the rimless lenses 12 look like full-rim or half-rim glasses.

Figure 47:
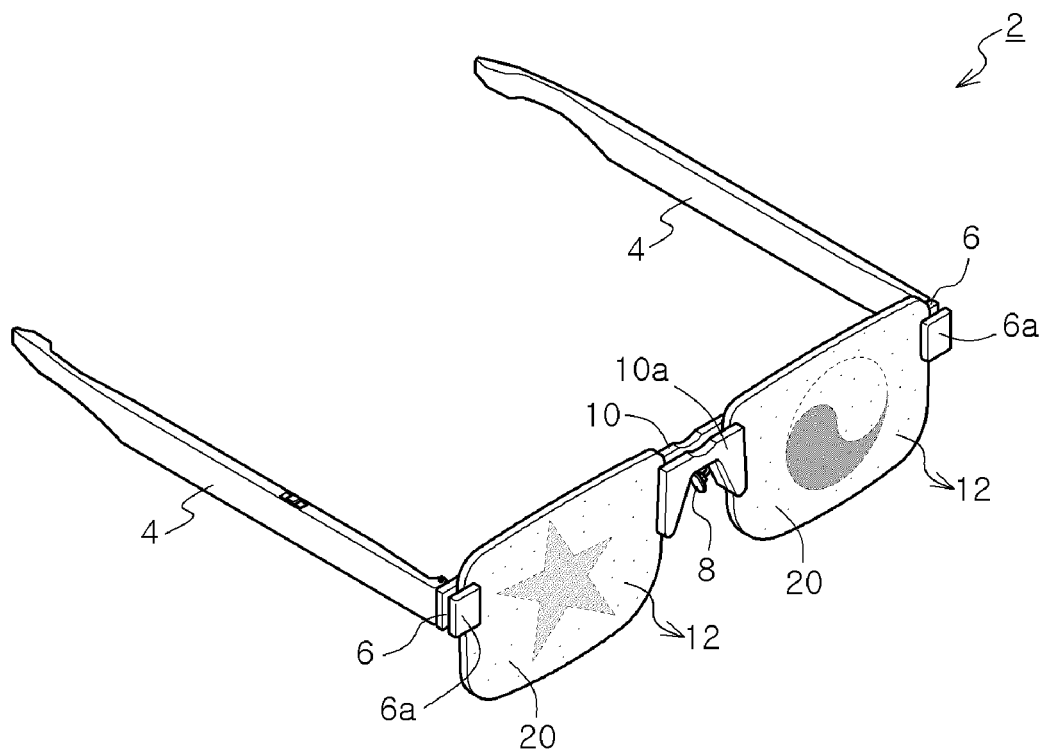
FIG. 47 is a view showing an example of the self-customized glasses that figures are expressed on the glass lenses according to the eighth preferred embodiment of the present invention as a wearer wants.

Additionally, FIG. 47 is a view showing an example of the self-customized glasses 2 that figures which the wearer likes, for instance, a national flag pattern or a heart shape, can be promptly expressed on the micro LED display skins 20 of the lenses 12 according to the eighth preferred embodiment of the present invention.

Figure 48:
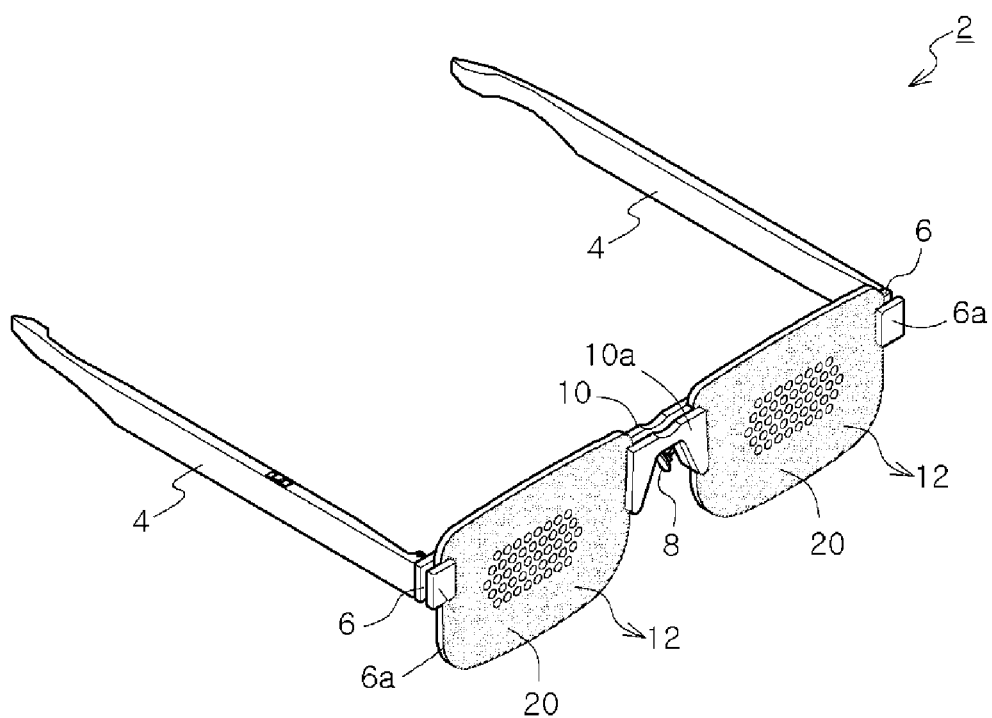
FIG. 48 is a view showing an example of the self-customized glasses for the purpose of sight correction like pin hole glasses according to the eighth preferred embodiment of the present invention.

FIG. 48 is a view showing an example of the self-customized glasses 2 that pin hole glasses for the purpose of sight correction are formed on the transparent micro LED display skins 20 of the lenses 12 according to the eighth preferred embodiment of the present invention.

Figure 49:
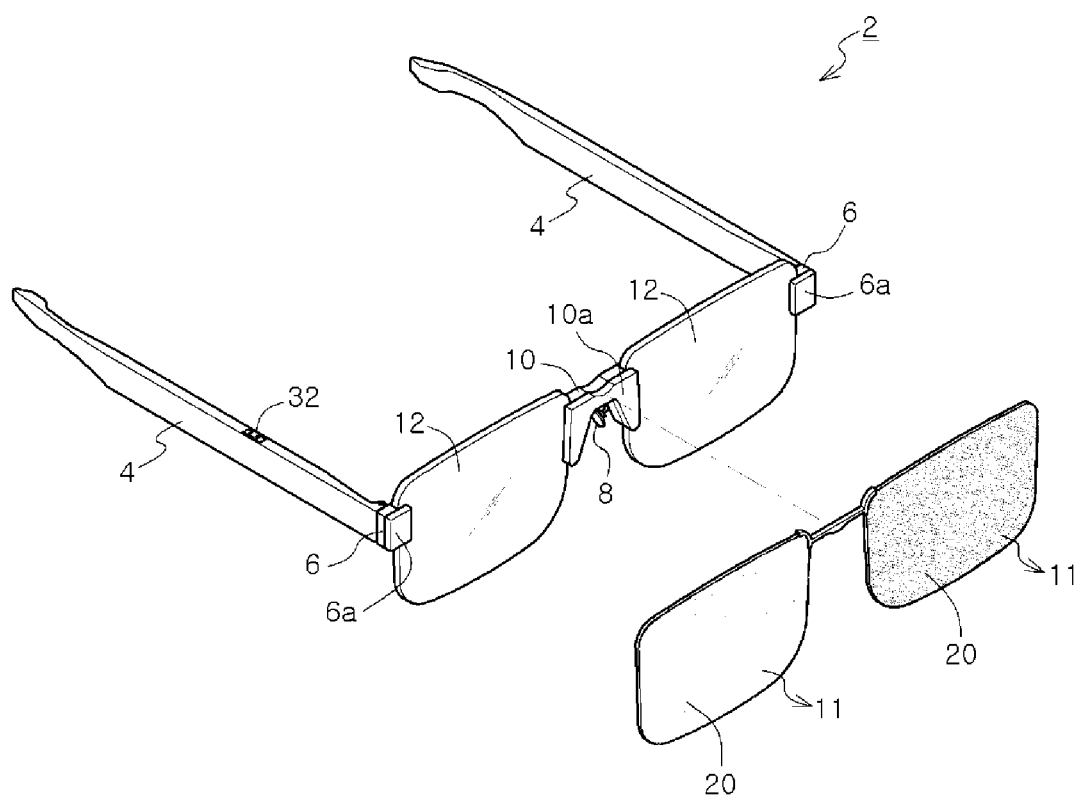
FIG. 49 is a view showing an example of the self-customized glasses using over lenses on which a transparent micro LED display skin is coated according to the eighth preferred embodiment of the present invention.

FIG. 49 is a view showing an example of the self-customized glasses further including over lenses 11 overlaid on the right and left lenses 12.

Referring to FIG. 49, according to the eighth preferred embodiment of the present invention, a main master part 30 for wireless control of the transparent micro LED display skins 20 is disposed in the temple 4, and a remote slave 50 for actuating the transparent micro LED display skins 20 is disposed in the over lens 11.

That is, the self-customized glasses 2 illustrated in FIG. 49 include a pair of lenses 12, right and left temples 4 connected to right and left lens connection head parts 6, a bridge part 10 having nose pads 8 and commonly connecting right and left lenses 12, and a pair of the lenses 12, and the parts are disposed independently to be assembled to and disassembled from each other by magnetism. The self-customized glasses 2 further include right and left over lenses 11 overlaid on the right and left lenses 12. The transparent micro LED display skins 20 are coated on the over lenses 11, main master part 30 for wireless control the transparent micro LED display skins 20 is disposed in the temple 4, and the remote slave 50 for actuating the transparent micro LED display skins 20 is disposed in the lens 12.

Figure 50:
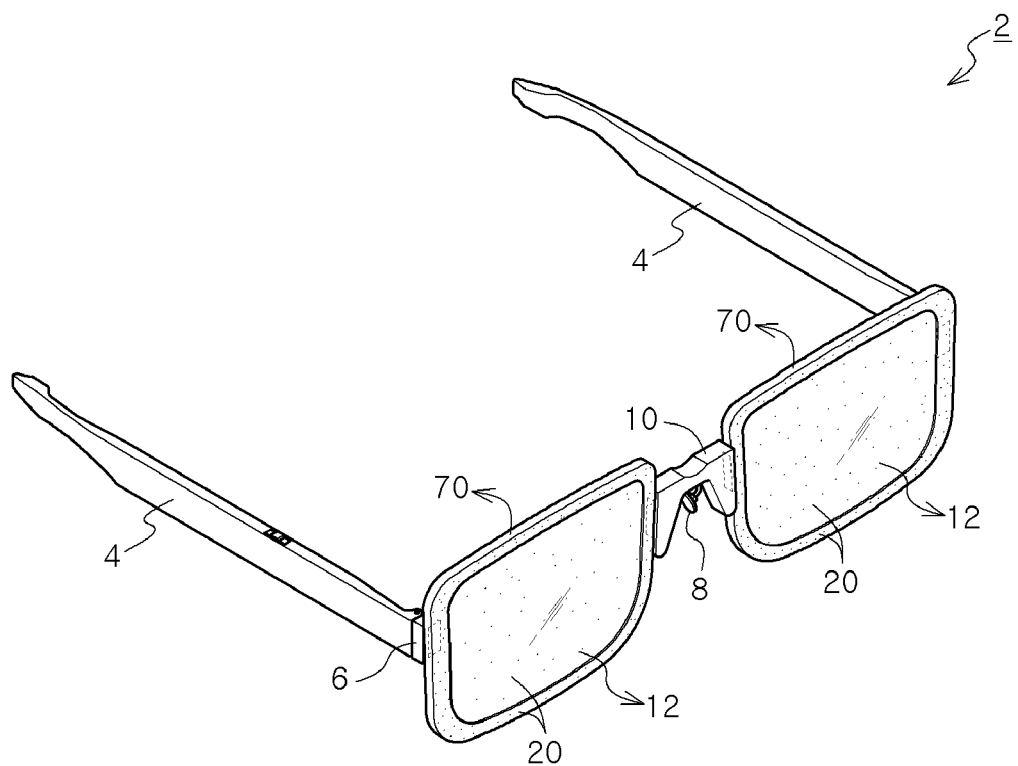
FIG. 50 is a perspective view showing an assembled state of self-customized glasses according to a ninth preferred embodiment of the present invention.
Figure 51:
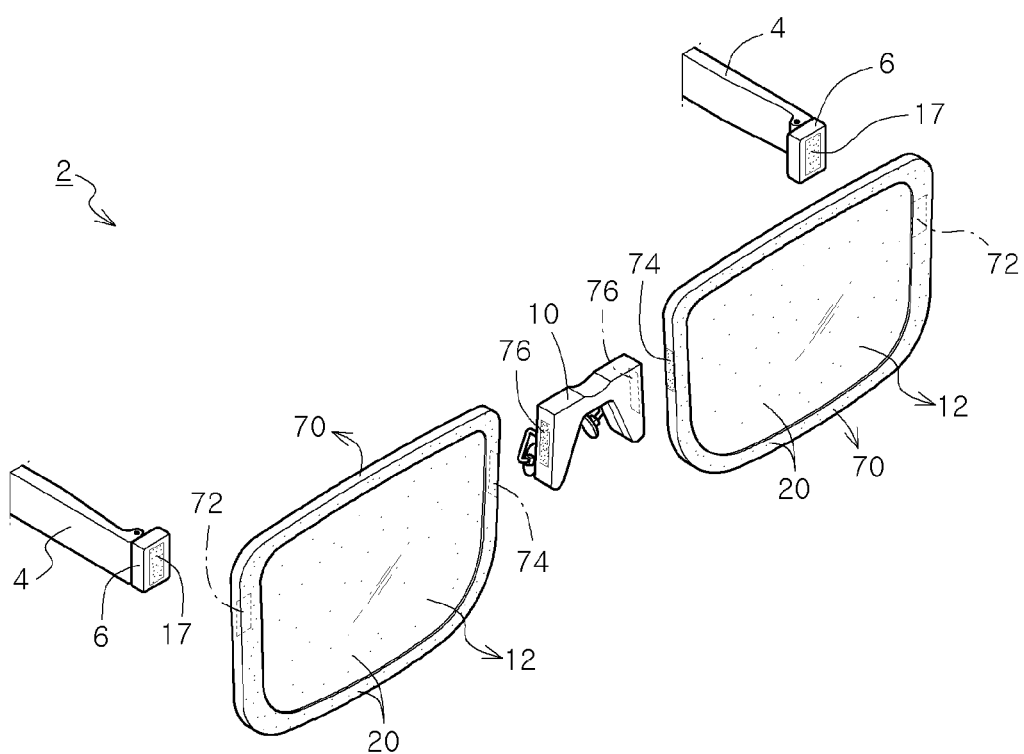
FIG. 51 is an exploded perspective view of FIG. 50.
Figure 52:
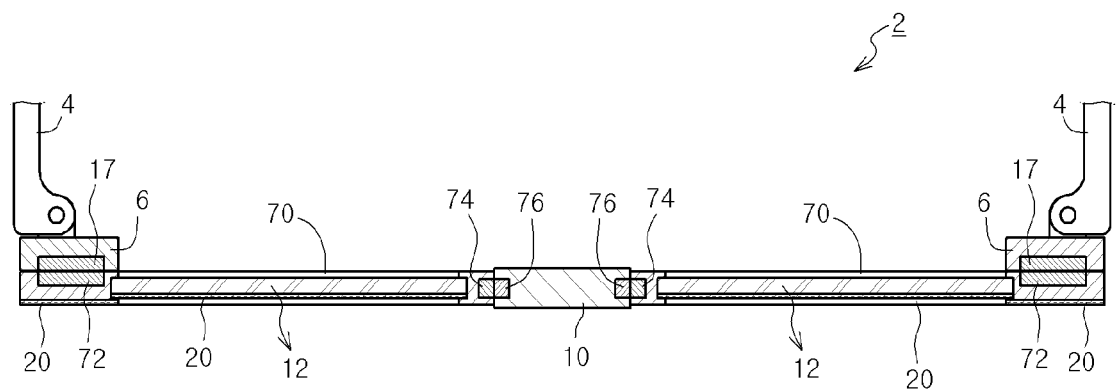
FIG. 52 is a cross sectional view of the self-customized glasses according to the ninth preferred embodiment of the present invention.

FIGS. 50 to 52 illustrate self-customized glasses 2 according to the ninth preferred embodiment of the present invention. FIG. 50 is a perspective view showing an assembled state of the self-customized, FIG. 51 is an exploded perspective view of FIG. 50, and FIG. 52 is a cross sectional view of the self-customized glasses of FIG. 50.

The self-customized glasses 2 according to the ninth preferred embodiment of the present invention illustrated in FIGS. 50 to 52 are self-assembly type self-customized glasses having a frame, and transparent micro LED display skins 20 are coated on the lenses 12.

The self-customized glasses 2 according to the ninth preferred embodiment of the present invention illustrated in FIGS. 50 to 52 have a glasses frame differently from the self-customized glasses of the embodiment illustrated in FIGS. 35 to 40, and the glasses frame is connected by magnetism. The self-customized glasses 2 according to the ninth preferred embodiment include right and left temples 4, right and left lens connection head parts 6 hinge-connected to the right and left temples 4, a bridge part 10 having nose pads 8 and connecting right and left glasses frames 70 to which the lenses 12 are combined, and right and left glasses frames 70 to which right and left lenses 12 are combined. The components of the glasses can be assembled, disassembled, and fixed by magnetism.

That is, the self-customized glasses 2 according to the ninth preferred embodiment of the present invention include right and left glasses frames 70 to which lenses 12 are combined, right and left temples 4 connected to right and left lens connection head parts 6, a bridge part 10 having nose pads 8 and commonly connecting right and glasses frames 70, and a pair of the lenses 12, and the parts are disposed independently to be assembled to and disassembled from each other by magnetism. The transparent micro LED display skins 20 capable of displaying colors and designs to the outside are coated on the lenses 12 combined with the right and left glasses frames 70. A main master part 30 for wireless control the transparent micro LED display skins 20 is disposed in the temple 4, and the remote slave 50 for actuating the transparent micro LED display skins 20 is disposed in the glasses frame 70.

In FIGS. 50 to 52, unexplained reference numerals 72, 74 and 76 are magnets for fixing by magnetism.

In the self-customized glasses 2 according to the ninth preferred embodiment of the present invention illustrated in FIGS. 50 to 52, the transparent micro LED display skins 20 are coated on the lenses 12, but as shown in FIGS. 50 to 52, the transparent micro LED display skins 20 may be further disposed in the glasses frames 70.

Because the transparent micro LED display skins 20 are applied only to the lenses 12 or applied to the lenses 12 and the glasses frames 70, colors or designs may be expressed just on the lenses 12 or on the lenses 12 and the glasses frames 70 in an instant.

Figure 53:
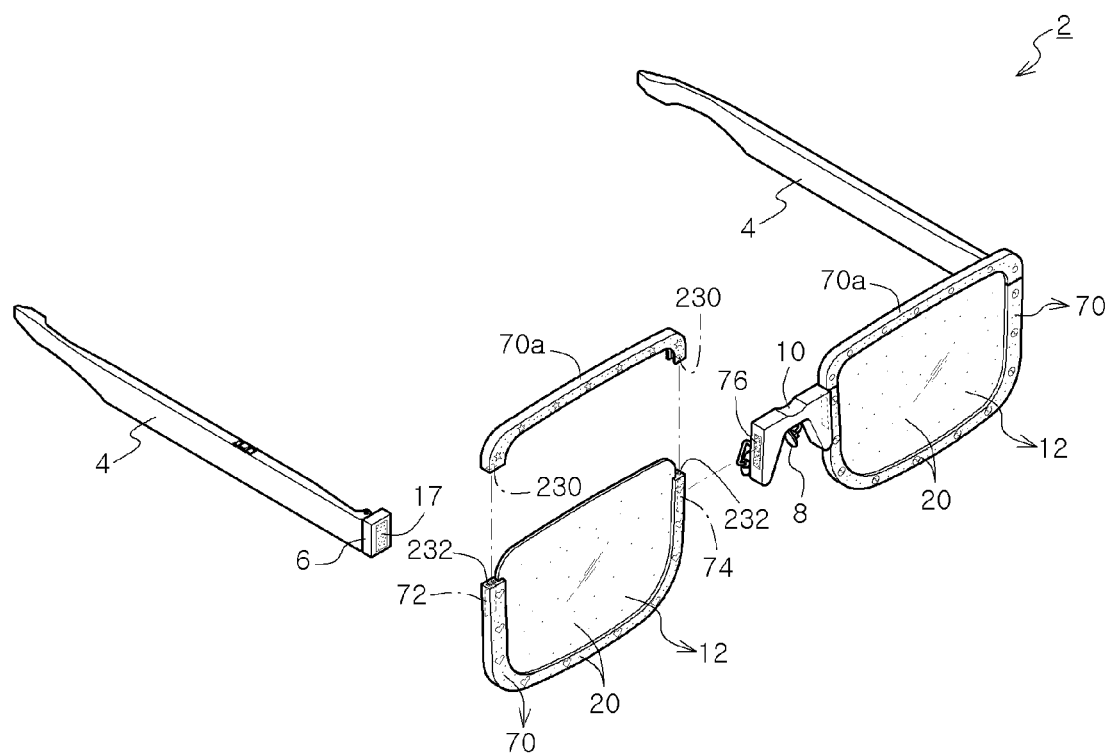
FIG. 53 is an exploded perspective view of self-customized glasses according to a tenth preferred embodiment of the present invention.

FIG. 53 is an exploded perspective view of self-customized glasses 2 according to a tenth preferred embodiment of the present invention, wherein the right and left glasses frames 70 are self-customized frames capable of being assembled and disassembled by magnetism. In this instance, the glasses frames 70 serves as an ornament and a magnetic fixing member.

In FIG. 53, the glasses frames 70 are assembled in a half-rim shape, and the unexplained reference number 70a means an ornamental frame assembled to the glasses frame 70 of the half-rim type by magnetism.

In FIG. 53, the unexplained reference numerals 230 and 232 are magnets for fixing the glasses frames 70 and the ornamental frames 70a by magnetism.

As shown in FIG. 53, the tenth preferred embodiment is a modification of the ninth preferred embodiment, wherein the transparent micro LED display skins 20 may be also coated on the glasses frames 70, and ornamental patterns illustrated in FIG. 53, such as a star shape, a heart shape, a rose shape, and so on, may be coated on the ornamental frames 70a. If necessary, the transparent micro LED display skins 20 may be also coated on the ornamental frames 70a to express various graphics.

In FIG. 53, the glasses frames 70 and the ornamental frames 70a may be all formed as ornaments and may be all coated with the transparent micro LED display skins 20. Alternatively, the glasses frames 70 and the ornamental frames 70a may be partially coated with the transparent micro LED display skins 20.

The self-customized glasses according to the present invention are applicable to various glasses, such as fashion glasses or functional glasses.

What is claimed is:

1. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism,
   wherein magnets are respectively buried in one side portion of each lens connection head part and right and left sides of the bridge part, and magnet fixing members for the head part and for the bridge part respectively having magnets acting attraction to the magnets of the lens connection head parts and the bridge part are disposed to support and fix the lenses,
   wherein transparent micro LED display skins are coated on at least one among the temples connected with the right and left lens connection head parts, the bridge part, and the lenses, and
   wherein connection cords are connected between the right and left lens connection head parts for supporting and fixing the lenses by magnetism and the magnet fixing member for the head part and between the bridge part and the magnet fixing member for the bridge part.

2. The self-customized glasses according to claim 1, wherein the transparent micro LED display skins formed on the lenses are formed on outer circumferential portions of the lenses in order to provide the look of a frame.

3. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism,
  wherein magnetically attached groove parts, in which magnets are buried, are respectively disposed in one side portion of each lens connection head part and right and left sides of the bridge part,
  wherein magnetic members are respectively formed at edges of the lenses so that the lenses having the magnetic members are fit and fixed to the magnetically attached groove parts by magnetism,
  wherein transparent micro LED display skins are coated on at least one among the temples connected with the right and left lens connection head parts, the bridge part, and the lenses, and
  main master parts respectively mounted in the right and left lenses in order to wirelessly control transparent micro LED display skins for displaying colors and designs to the outside.

4. The self-customized glasses according to claim 3, wherein the transparent micro LED display skins formed on the lenses are formed on outer circumferential portions of the lenses in order to provide the look of a frame.

5. The self-customized glasses according to claim 3, wherein the magnetic member of each lens includes one among a transparent magnet film coated on the surface of the lens in a band shape and magnetic fragments arranged and planted at right and left end portions of the lens.

6. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism,
  wherein magnets are respectively buried in one side portion of each lens connection head part and right and left sides of the bridge part, and magnet fixing members for the head part and for the bridge part acting attraction to the magnets of the lens connection head parts and the magnets of the bridge part are disposed to support and fix the lenses, and
  wherein connection cords are connected between the right and left lens connection head parts for supporting and fixing the lenses by magnetism and the magnet fixing member for the head part and between the bridge part and the magnet fixing member for the bridge part.

7. The self-customized glasses according to claim 6, wherein matching uneven parts are formed flat between inner faces of the lens connection head parts and inner faces of the magnet fixing members and between inner face of the bridge part and the inner faces of the magnet fixing members for the bridge part to get in surface contact with each other, or are formed between the inner faces of the right and left lens connection head parts and the inner faces of the magnet fixing members for the head parts and between the inner face of the bridge part and the magnet fixing members for the bridge part to match with each other.

8. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism,
  wherein magnetically attached groove parts, in which magnets are buried, are respectively disposed in one side portion of each lens connection head part and right and left sides of the bridge part,
  wherein magnetic members are respectively formed at edges of the lenses so that the lenses having the magnetic members are fit and fixed to the magnetically attached groove parts by magnetism, and
  main master parts respectively mounted in the right and left lenses in order to wirelessly control transparent micro LED display skins for displaying colors and designs to the outside.

9. The self-customized glasses according to claim 8, wherein the magnetic member of each lens includes one among a transparent magnet film coated on the surface of the lens in a band shape and magnetic fragments arranged and planted at right and left end portions of the lens.

10. Self-customized glasses comprising:
  right and left half-rim frames connected with temples;
  a bridge part having cut surfaces;
  magnets buried in the cut surfaces of the bridge part in order to make the right and left half-rim frames attached to each other by magnetism;
  lenses attached and fixed to fitting grooves of the right and left frames by magnetism, and
  main master parts mounted in the lenses in order to wirelessly control transparent micro LED display skins for displaying colors and designs to the outside.

11. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism, comprising:
  main master parts respectively mounted in the right and left lenses in order to wirelessly control transparent micro LED display skins for displaying colors and designs to the outside; and
  a remote slave disposed on a glasses main body to actuate the transparent micro LED display skins.

12. The self-customized glasses according to claim 11, wherein magnets are respectively buried in one side portion of each lens connection head part and right and left sides of the bridge part, and magnet fixing members for the head part and for the bridge part acting attraction to the magnets of the lens connection head parts and the magnets of the bridge part are disposed to support and fix the lenses.

13. The self-customized glasses according to claim 11, wherein the main master part performs wireless connection with a smart phone through short-range wireless communication, and performs wireless control to express various colors and designs of the transparent micro LED display skins of the lenses by operating a mobile application for designs and colors of the self-customized glasses downloaded to the smart phone.

14. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism, comprising:
  right and left over lenses overlaid on the right and left lenses and coated with transparent micro LED display skins;
  main master parts respectively mounted in the right and left lenses in order to wirelessly control the transparent micro LED display skins; and a remote slave disposed on a glasses main body to actuate the transparent micro LED display skins.

15. Self-customized glasses, which includes a pair of lenses, right and left temples connected to right and left lens connection head parts, a bridge part having nose pads and commonly connecting right and left lenses, and a pair of the lenses in such a way that the parts are disposed independently to be assembled to and disassembled from each other by magnetism, comprising:
- transparent micro LED display skins coated on the lenses combined with right and left glasses frames to display colors and designs to the outside;
- main master parts respectively mounted in the temples in order to wirelessly control the transparent micro LED display skins; and
- a remote slave disposed on a glasses frame to actuate the transparent micro LED display skins.

16. The self-customized glasses according to claim 15, wherein the right and left glasses frames are self-customized frames capable of being assembled and disassembled by magnetism.

17. The self-customized glasses according to claim 16, wherein the transparent micro LED display skins are further disposed on the glasses frame to display colors and designs to the outside.

18. The self-customized glasses according to claim 15, wherein the transparent micro LED display skins are further disposed on the glasses frame to display colors and designs to the outside.

\* \* \* \* \*